US012698658B2

(12) United States Patent
Schmutter

(10) Patent No.: US 12,698,658 B2
(45) Date of Patent: Aug. 4, 2026

(54) SYSTEM AND METHOD FOR WEAPONS DETECTION WHILE MAINTAINING ORIGINALLY-INTENDED EGRESS CAPACITY

(71) Applicant: Bruce Schmutter, Long Island City, NY (US)

(72) Inventor: Bruce Schmutter, Long Island City, NY (US)

( * ) Notice: Subject to any disclaimer, the term of this patent is extended or adjusted under 35 U.S.C. 154(b) by 0 days.

(21) Appl. No.: 19/305,902

(22) Filed: Aug. 21, 2025

(65) Prior Publication Data

US 2025/0389144 A1 Dec. 25, 2025

Related U.S. Application Data

(63) Continuation-in-part of application No. 19/016,460, filed on Jan. 10, 2025, which is a continuation of (Continued)

(51) Int. Cl.
*E05C 19/00* (2006.01)
*E05B 53/00* (2006.01)
*E05C 19/18* (2006.01)

(52) U.S. Cl.
CPC .......... *E05C 19/005* (2013.01); *E05B 53/001* (2013.01); *E05C 19/188* (2013.01)

(58) Field of Classification Search
CPC ...... E05C 19/003; E05C 19/005; E05C 19/18; E05C 19/188; G01S 13/886; G01S 13/887
See application file for complete search history.

(56) References Cited

U.S. PATENT DOCUMENTS 49,296 A 8/1865 Parker
361,693 A 4/1887 Guild
(Continued)

FOREIGN PATENT DOCUMENTS

CN 107939192 A 4/2018
CN 209419020 U 9/2019
(Continued)

OTHER PUBLICATIONS

International Search Report for PCT Application No. PCT/US2025/017199 dated Jun. 9, 2025.
(Continued)

*Primary Examiner* — Peter M Bythrow
(74) *Attorney, Agent, or Firm* — Caesar Rivise, PC

(57) ABSTRACT

A system and method that balances the two competing interests of weapons detection while maintaining full egress capacity at a portal. A two-part weapons detection device is installed at the portal with one portion fixed to the floor at a side of the portal and the other portion is mounted to the door. With the door closed, the requisite weapons detection field can be established. When it becomes necessary to use the full egress capacity, the door can be opened without the need to remove or disengage the other portion. A laser scanner is also mounted at the top of the portal to establish an upper detection field to prevent a perpetrator from passing a weapon above the detection field. This system/method forms a "demising point" for a larger system and method that includes logical and physical building compartments for prioritizing staff protection against an assailant in an affordable manner.

30 Claims, 24 Drawing Sheets

Related U.S. Application Data application No. 18/777,125, filed on Jul. 18, 2024, now Pat. No. 12,227,975.

(60) Provisional application No. 63/685,884, filed on Aug. 22, 2024, provisional application No. 63/528,503, filed on Jul. 24, 2023.

(56) References Cited

U.S. PATENT DOCUMENTS

| | | | | | |
|---|---|---|---|---|---|
| 459,676 | A | | 9/1891 | Daniel | |
| 475,368 | A | | 5/1892 | Welch | |
| 618,818 | A | | 2/1899 | Adams | |
| 670,854 | A | | 3/1901 | Deibel | |
| 922,083 | A | | 5/1909 | Campbell | |
| 982,136 | A | | 1/1911 | Hanson | |
| 1,057,995 | A | | 4/1913 | Bull | |
| 1,654,221 | A | | 12/1927 | Kline | |
| 3,239,261 | A | | 3/1966 | Bryson et al. | |
| 3,989,286 | A | | 11/1976 | Cleff | |
| 4,029,176 | A | | 6/1977 | Mills | |
| 4,308,803 | A | * | 1/1982 | Pretini | E06B 3/903 109/21 |
| 4,461,221 | A | * | 7/1984 | Schandle | E05G 5/02 109/6 |
| 4,481,887 | A | * | 11/1984 | Urbano | E05G 5/02 109/6 |
| 4,586,441 | A | * | 5/1986 | Zekich | E05G 5/02 109/6 |
| 4,656,954 | A | * | 4/1987 | Tonali | E05G 5/003 109/6 |
| 4,741,275 | A | * | 5/1988 | Lewiner | E05C 7/002 109/7 |
| 4,871,204 | A | * | 10/1989 | Cook | E05B 47/02 70/276 |
| 5,195,448 | A | * | 3/1993 | Sims | E05G 5/02 109/6 |
| 5,311,166 | A | * | 5/1994 | Frye | G08B 15/00 340/552 |
| 5,525,963 | A | * | 6/1996 | Purssey | A62C 2/24 49/31 |
| 5,664,812 | A | | 9/1997 | Marinoni | |
| 5,694,867 | A | * | 12/1997 | Diaz-Lopez | E05G 5/003 109/6 |
| 5,992,094 | A | * | 11/1999 | Diaz | G01V 3/105 109/6 |
| 6,298,603 | B1 | * | 10/2001 | Diaz | E05G 5/02 109/6 |
| 6,308,644 | B1 | * | 10/2001 | Diaz | E05G 5/003 109/6 |
| 6,422,463 | B1 | * | 7/2002 | Flink | G07C 9/00182 235/382 |
| 6,484,650 | B1 | * | 11/2002 | Stomski | E05G 5/02 109/6 |
| 6,629,713 | B1 | | 10/2003 | Duffy et al. | |
| 6,745,520 | B2 | * | 6/2004 | Puskaric | E05G 5/003 52/64 |
| 6,786,005 | B1 | * | 9/2004 | Williams | E05B 65/1033 49/141 |
| 7,030,750 | B2 | * | 4/2006 | Lee | G08B 19/00 340/572.1 |
| 7,113,092 | B2 | * | 9/2006 | Keene | G01V 11/00 340/686.1 |
| 7,965,178 | B1 | | 6/2011 | Schmuttor et al. | |
| 9,435,147 | B1 | | 9/2016 | Giandomenico et al. | |
| 9,871,399 | B2 | | 1/2018 | Mittleman et al. | |
| 9,891,314 | B2 | * | 2/2018 | Morton | G01S 13/87 |
| 9,945,158 | B2 | * | 4/2018 | Lehner, Jr. | E05B 65/1093 |
| 10,174,532 | B2 | | 1/2019 | Couturier | |
| 10,431,067 | B2 | * | 10/2019 | Keene | G01V 3/08 |
| 10,614,687 | B2 | * | 4/2020 | Rehfeld | G08B 13/19645 |
| 11,326,387 | B2 | * | 5/2022 | Osann, Jr. | E05F 15/646 |
| 11,645,882 | B2 | * | 5/2023 | Ardrey | G07C 9/15 340/5.31 |
| 11,649,661 | B2 | | 5/2023 | Fischer | |
| 11,823,545 | B2 | * | 11/2023 | Hill | G08B 5/36 |
| 11,840,876 | B2 | * | 12/2023 | Raynal | E05F 17/00 |
| 12,039,816 | B2 | * | 7/2024 | Zimmermann | G07C 9/10 |
| 12,183,144 | B2 | * | 12/2024 | Hewitt | G01S 13/04 |
| 12,227,975 | B1 | | 2/2025 | Schmutter | |
| 12,305,963 | B1 | * | 5/2025 | Schmutter | F41H 5/24 |
| 12,469,348 | B2 | * | 11/2025 | Bohm | G07C 9/15 |
| 2003/0208966 | A1 | | 11/2003 | Puskaric et al. | |
| 2008/0244978 | A1 | * | 10/2008 | Soyugenc | E05F 15/608 49/42 |
| 2011/0291426 | A1 | | 12/2011 | Gibson | |
| 2014/0265363 | A1 | * | 9/2014 | Mock | E05B 53/001 292/177 |
| 2014/0366395 | A1 | | 12/2014 | Ward | |
| 2017/0211314 | A1 | | 7/2017 | Raffi et al. | |
| 2019/0277999 | A1 | * | 9/2019 | Chen | G01S 13/887 |
| 2020/0071960 | A1 | * | 3/2020 | Wadlow | E05B 53/001 |
| 2021/0108459 | A1 | * | 4/2021 | O'Brien | E05G 5/02 |
| 2021/0156186 | A1 | * | 5/2021 | Osann, Jr. | E05D 15/58 |
| 2021/0287468 | A1 | * | 9/2021 | Vilhelmsen | G01S 13/89 |
| 2022/0107439 | A1 | * | 4/2022 | Manneschi | G01V 3/36 |
| 2022/0335763 | A1 | | 10/2022 | Bohm | |
| 2023/0375695 | A1 | * | 11/2023 | Tan | G01V 8/005 |
| 2024/0094383 | A1 | * | 3/2024 | Mori | G07C 9/20 |
| 2024/0118411 | A1 | * | 4/2024 | Sheen | G01V 3/12 |
| 2024/0341614 | A1 | * | 10/2024 | Clark | A61B 5/0507 |
| 2025/0034922 | A1 | * | 1/2025 | Schmutter | E05C 19/005 |

FOREIGN PATENT DOCUMENTS

| | | | |
|---|---|---|---|
| CN | 113638574 | A | 11/2021 |
| GB | 2359335 | A | 8/2001 |
| JP | H11323840 | A | 11/1999 |
| KR | 200410054 | Y1 | 3/2006 |
| WO | WO2017/191449 | A1 | 11/2017 |

OTHER PUBLICATIONS

International Search Report for related PCT Application No. PCT/US2024/038730 dated Oct. 28, 2024.

"How to Choose the Perfect Door Lock", Latham's Hardware, © 2024, retrieved on Jul. 18, 2024 from https://www.lathamshardware.co.uk/blog/how-to-guides/how-to-choose-the-perfect-door-lock/.

"What is the Safety Act?", Department of Homeland Security, Jan. 2020.

"The Anchor—Create a Safe Zone During a Crisis—The Only Patented Device on the Market", Anchorman, Inc., @2024, retrieved on Jul. 18, 2024 fro https://www.anchormaninc.com.

Anchorman, Inc., "Installation", Apr. 2023.

"Panic Exit Device, UL Panic Rated, ANSI 1, 32 In. Wide", Harney Hardware, © 2025, retrieved on Aug. 20, 2025 from https://www.harneyhardware.com/products/panic-exit-device-ul-panic-rated-ansi-1-32-in-wide-powder-coated- aluminum-pe550036pp.

Orbach, "Inside the Kosher Door", Jewish Action—The Magazine of the Orthodox Union, © 2025, retrieved on Aug. 20, 2025 from https://jewishaction.com/inside-the-ou/the-kosher-door/.

"A Groundbreaking Weapons Detection System", CEIA USA, retrieved on Aug. 20, 2025 from https://www.ceia.net/security/product.aspx?a=opengate.

International Search Report for PCT Application No. PCT/US2025/043227 dated Dec. 18, 2025.

* cited by examiner

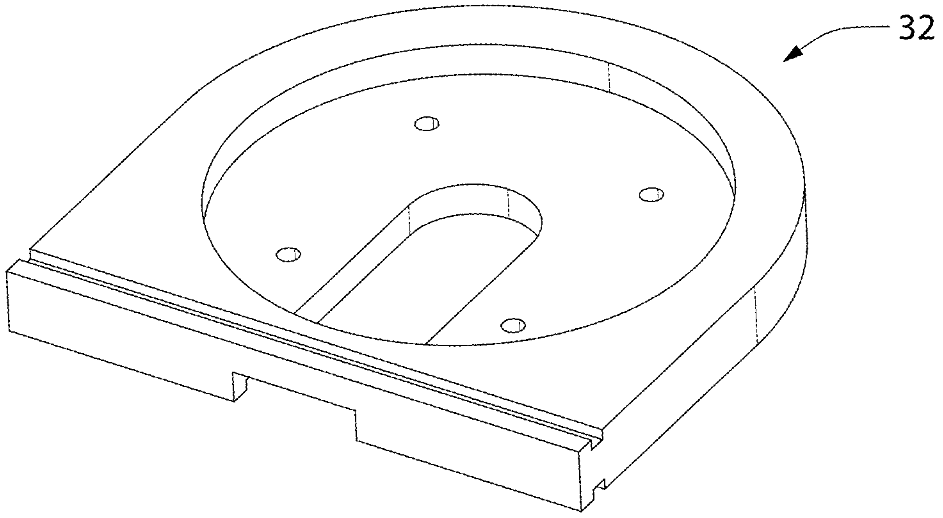
FIG. 6
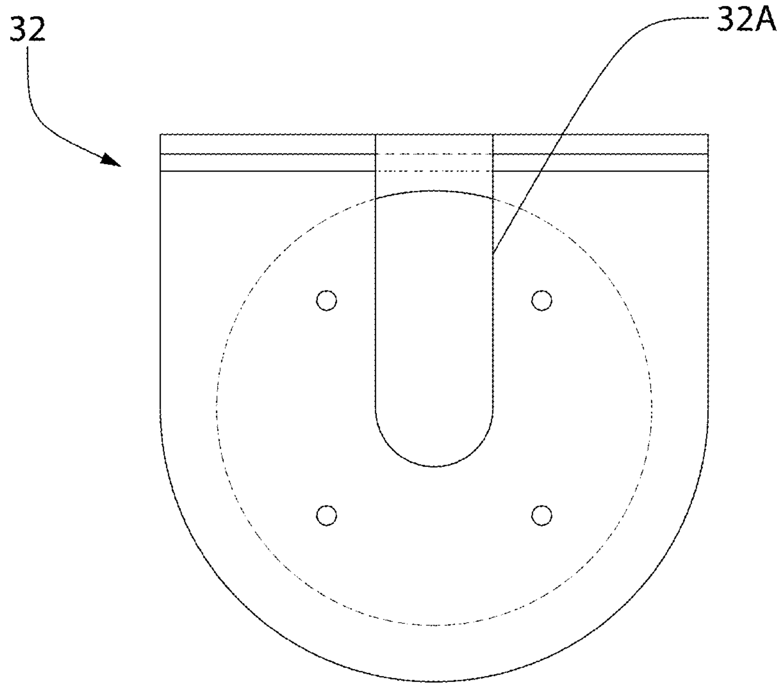
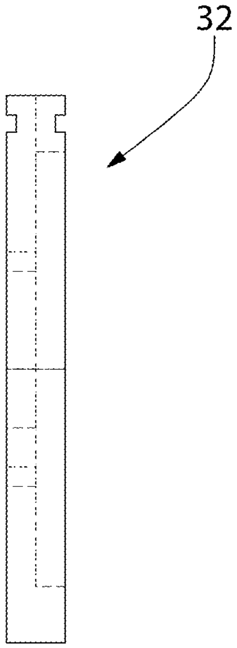
FIG. 6A
FIG. 6B

SYSTEM AND METHOD FOR WEAPONS DETECTION WHILE MAINTAINING ORIGINALLY-INTENDED EGRESS CAPACITY

CROSS-REFERENCE TO RELATED APPLICATIONS

This non-provisional application claims the benefit under 35 U.S.C. § 119(e) of Application Ser. No. 63/685,884 filed on Aug. 22, 2024 entitled SYSTEM AND METHOD FOR WEAPONS DETECTION WHILE MAINTAINING ORIGINALLY-INTENDED EGRESS CAPACITY and this non-provisional application is also a Continuation-in-Part application and claims the benefit under 35 U.S.C. § 120 of application Ser. No. 19/016,460 filed on Jan. 10, 2025 which in turn is a Continuation application of application Ser. No. 18/777,125 (now U.S. Pat. No. 12,227,975) filed on Jul. 18, 2024 and both of which are entitled SYSTEM AND METHOD FOR SHELTERING IN PLACE WITH ADVANCED RESPONDER NOTIFICATION AND READY ACCESS and which in turn claims the benefit under 35 U.S.C. § 119(e) of Application Ser. No. 63/528,503 filed on Jul. 24, 2023 and entitled SYSTEM AND METHOD FOR A UNIVERSAL TAMPER-RESISTANT SHELTER-IN-PLACE BARRICADE LOCKING DEVICE, and all of whose entire disclosures are incorporated by reference herein.

BACKGROUND OF THE INVENTION

This present invention relates to weapons detection at a portal, and more particularly, to a system and method that balances the two competing interests of weapons detection and maintains full egress capacity at a portal.

In designing commercial facilities, one question that needs to be addressed is "how many exits are needed?" In answering this question, egress capacity must be considered and that can raise complications. Door widths are carefully designed based upon occupancy load and egress capacity. As shown by way of example in FIG. 1A, a 72 inch wide doorway can accommodate 196 people/minute, or "person flow rate". The doorway or portal (shown in FIG. 1B), by way of example only, typically is approximately 72 inches in width and approximately 84 inches in height. If that same doorway is then restricted down to, e.g., 28 inches in width, the person flow rate can be greatly diminished to 76 people/minute. Enhancing perimeter building security cannot impede upon occupants' ability to exit. In addition, the current need for weapons detection today is well understood. Thus, in order to detect concealed weapons on a person at a portal, detection devices are placed at the portal. And based upon current industry offerings, this often reduces the amount of available "free" egress. However, no reduction of egress capacity is permitted by code. These non-contact metal detection devices comprise an emitter and a detector (e.g., a reader) that establish an electromagnetic field (EM) therebetween. But to detect thoroughly, the EM field must be limited to a spacing of the emitter PD1 and detector PD2 to be in the range of 32-36 inches (see FIG. 1C). So these two requirements work against each other. The first, egress capacity, seeks to maximize passage space while the second, a weapons EM metal detection field, seeks to restrict that passage space in order to properly detect the presence of a weapon.

FIG. 1C depicts an exemplary weapons detection methodology which uses an emitter column PD1 and a detector column PD2 sold under the tradename OPENGATE™ by Costruzioni Elettroniche Industriali Automatisimi (CEIA) S.p.A. of Italy installed at a portal. This exemplary metal detection device provides for high volume portable detection and is intended for onsite continual observation by security personnel; additional hand-wanding supplements that detection columns. The OPENGATE™ can be integrated within a monitoring system that provides an external alarm output for local/remote alerts. The OPENGATE™ is designed to negate small objects, such as cell phones, coffee tumblers, watches and other small items to minimize false alarms.

For hospitals, which have significant larger openings to allow for patient stretchers, wheel chairs, etc., reducing the portal down to 32-36 inches means reducing the prescribed door width by 40-60%; in particular, either the emitter column PD1 or the detector column PD2 must be secured into the original larger pathway to thereby force all pedestrians through the smaller restricted pathway, P1 (FIG. 1B). Such a reduction violates all municipal, state and national code requirements. In a hospital setting, such a reduction basically defeats the purpose of the large portals in the hospitals.

Thus, there remains a need for a detection system and methodology that balances these two competing requirements, namely, detecting weapons while maintaining the originally-intended egress capacity. Furthermore, there also remains a need for a system and method to monitor a next level mantrap to work in concert with this novel weapons detection system/methodology in order to protect staff and visitors in a building-wide or facility-wide environment in real-time and to do so in an affordable manner. The present invention solves these problems as set forth below.

All references cited herein are incorporated herein by reference in their entireties.

BRIEF SUMMARY OF THE INVENTION

A system for providing weapons detection at a portal of an enclosure while simultaneously permitting a clear opening width of the portal at any time without the need for third party action or special knowledge is disclosed. The portal has an open pathway and an adjacent door that is normally locked closed. The system comprises: a pair of metal detector pedestals (e.g., OPENGATE™ weapons detection system pedestals, etc.) wherein a first one of which is secured to a door frame on a first side of the open pathway and a second metal detector pedestal is secured to a free side of the door, and wherein the free side of the door forms a second side of the open pathway, wherein each of the pedestals is coupled to a power source for establishing an electromagnetic (EM) metal detection field therebetween across the open pathway; and a panic bar located on an inside side of the door, wherein the panic bar is configured to override a lock on the door to permit the door to be immediately unlocked and swung open in the event that the clear opening width be established in an emergency.

A method for providing weapons detection at a portal of an enclosure while simultaneously permitting a clear opening width of the portal at any time without the need for third party action or special knowledge is disclosed. The portal has an open pathway and an adjacent door and wherein the method comprises: mounting a first metal detector pedestal on a door frame on a first side of the open pathway; mounting a second metal detector pedestal on a free side of the door, wherein the free side of the door forms a second side of the open pathway; providing electrical power to the first and second metal detectors to establish an electromagnetic (EM) metal detection field therebetween across the open pathway, and wherein power to the second metal detector is conveyed through electrified hinges; locking the door using an electromagnetic lock; installing a panic bar on an inside side of the door, wherein the panic bar overrides the electromagnetic lock when the panic bar is activated during an emergency; and opening the door in an emergency by activating the panic bar to establish the clear opening width of the portal.

A building defense system for protecting occupants in a building and formed of a plurality of layers of protection is disclosed. The system comprises: a first layer of protection formed at a building perimeter portal, wherein the first layer of protection comprises a security card reader or keypad for gaining access to the building, wherein the security card reader and the keypad being coupled to a remote portal controlling and monitoring system; a second layer of protection, forming a demising point, comprising a weapons detection system at a portal inside the building after the building perimeter portal and having an open pathway and a normally locked closed door, wherein the weapons detection system comprises a first metal detector pedestal attached to a first side of the open pathway on a portal door frame and a second metal detector pedestal attached to a free side of the door that forms a second side of the open pathway, wherein each of the pedestals is coupled to a power source for establishing an electromagnetic (EM) metal detection field therebetween across the open pathway; the pedestals coupled to the monitoring system such that if the pair of metal detector pedestals detects a metal object therein on a person requesting entry (PRE), an alert is wherein the vestibule having a portal that is maintained in a locked condition by the monitoring system in the event that the weapons detection system detected a metal object on the PRE at the demising point or the PRE refuses to follow instructions, and either one now designated a person denied entry (PDE) while simultaneously instructing personnel on an opposite of the portal to avoid trying to pass through the portal and to divert the personnel to an alternate path away from the PDE.

A method of protecting occupants in a building using a plurality of layers of protection is disclosed. The method comprises: establishing a first layer of protection at a building perimeter portal by providing a security card reader or keypad for gaining access to the building and coupling the security card reader and the keypad to a remote portal controlling and monitoring system; establishing a second layer of protection by providing a weapons detection system at a portal inside the building after the building perimeter portal and wherein the portal of the second layer of protection comprises an open pathway and a normally locked closed door, the weapons detection system comprises a first metal detector pedestal attached to a first side of the open pathway on a portal door frame and a second metal detector pedestal attached to a free side of the door that forms a second side of the open pathway, each of the pedestals coupled to a power source for establishing an electromagnetic (EM) metal detection field therebetween across the open pathway and coupling the pedestals to the monitoring system such that if the pair of metal detector pedestals detects a metal object therein on a person requesting entry (PRE), an alert is generated and wherein the vestibule portal is maintained in a locked condition by the monitoring system in the event that the weapons detection system detected a metal object on the PRE at the demising point or the PRE refuses to follow instructions, and either one now designated a person denied entry (PDE) while simultaneously instructing personnel on an opposite of the portal to avoid trying to pass through the portal and to divert the personnel to an alternate path away from the PDE.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is an isometric view of the bottom protection ring of for mounting the pedestal on the door;

FIG. 6A is a bottom view of the bottom protection ring of FIG. 6;

FIG. 6B is a side view of the bottom protection ring of FIG. 6;

DETAILED DESCRIPTION OF THE PREFERRED EMBODIMENTS

Figure 1:
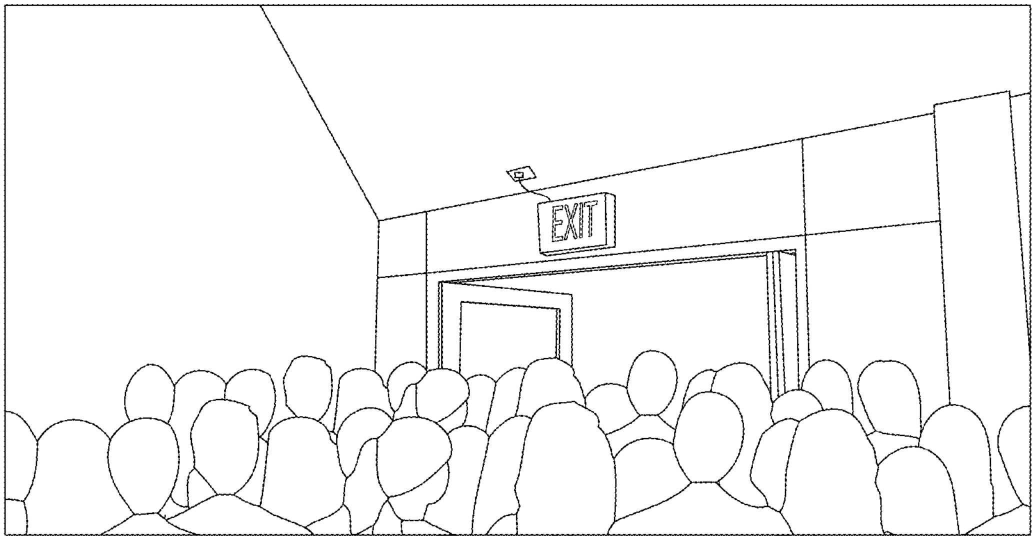
FIG. 1 (PRIOR ART)
FIG. 1 depicts an oversized crowd at an exit (e.g., 72 inch wide exit)
Figure 1A:
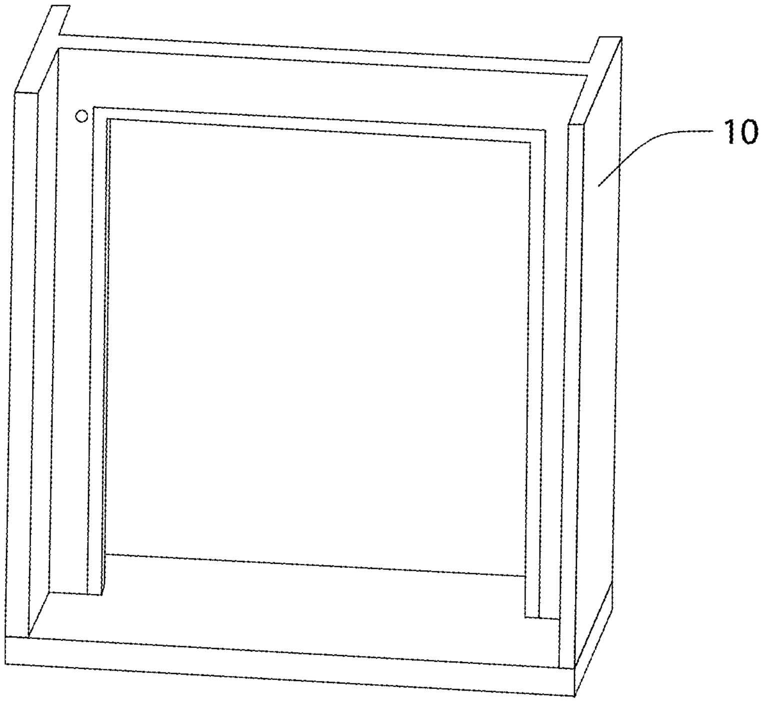
FIG. 1A (PRIOR ART)
FIG. 1A depicts a conventional portal opening used, for example, in hospitals.
Figure 1B:
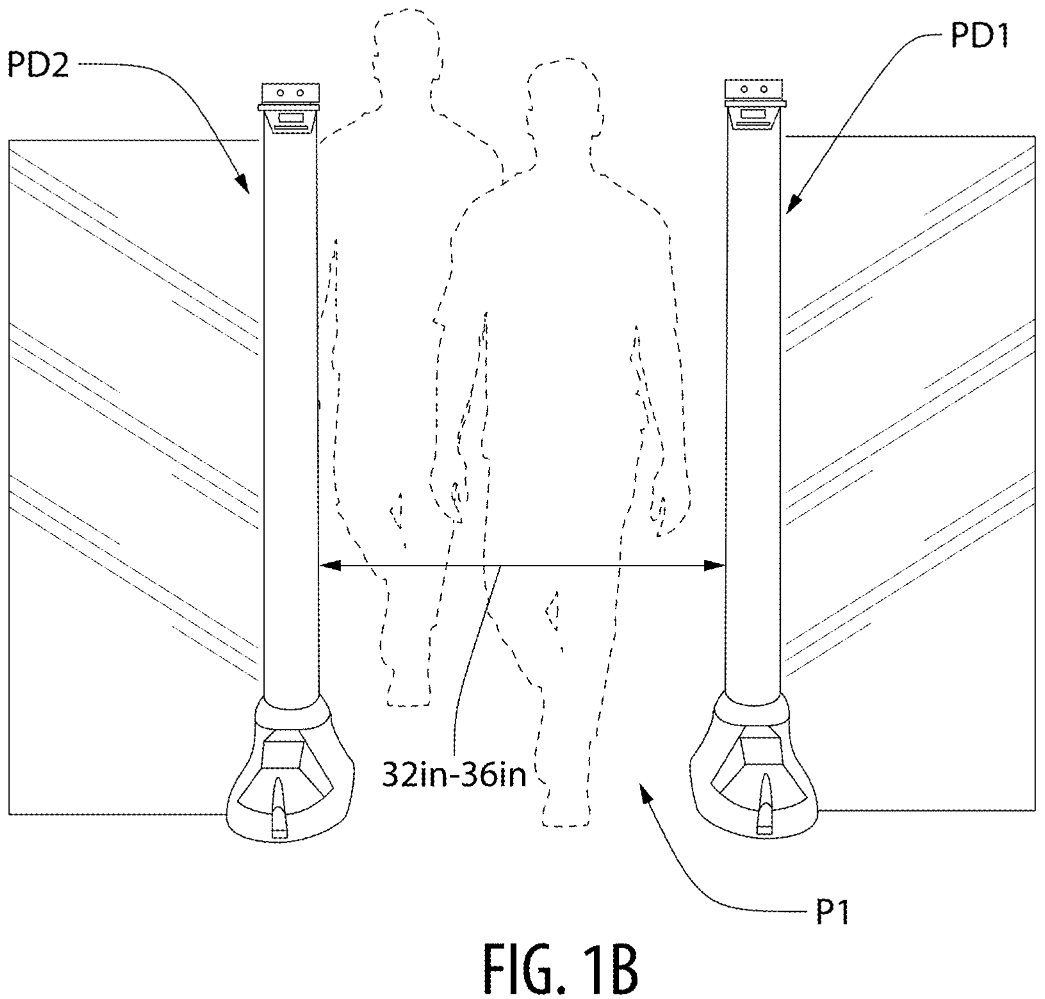
FIG. 1B (PRIOR ART)
FIG. 1B depicts a conventional weapons detection system located at a point of access or portal that provides a very limited single pathway.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The present invention is an integrated security and egress system designed to maintain full door aperture for emergency evacuation while enabling advanced screening and threat detection. When used with other protective devices (as will be discussed later), the integrated security and egress system forms an overall plurality of layers of protection for a facility.

The purpose of the present invention, as will be discussed below is to provide for:

weapon detection for staff entrances;
maintaining egress capacity for fire/other evacuation;
unmanned scanning with remote monitoring;
safeguarding to prevent individual circumvention;
lockdown system to ensure secure building perimeter;
maximizing the use of current technology; and
inherent compliance with all related Fire Codes.

Thus, the main thrust of the present invention 20 is to provide the maximum daily "path" PW2, as will be discussed later) for pedestrian traffic flow at any instant while staying within the 32-36 inch weapons detection field width when the maximum daily "path" is not needed and a more limited path PW1 is sufficient. Furthermore, the present invention 20 prevents any circumvention that a perpetrator may attempt to take advantage of since the weapons detection field may have a height limit that is less than the door height. In addition, the invention 20 operates whether it is monitored remotely or locally.

Figure 2:
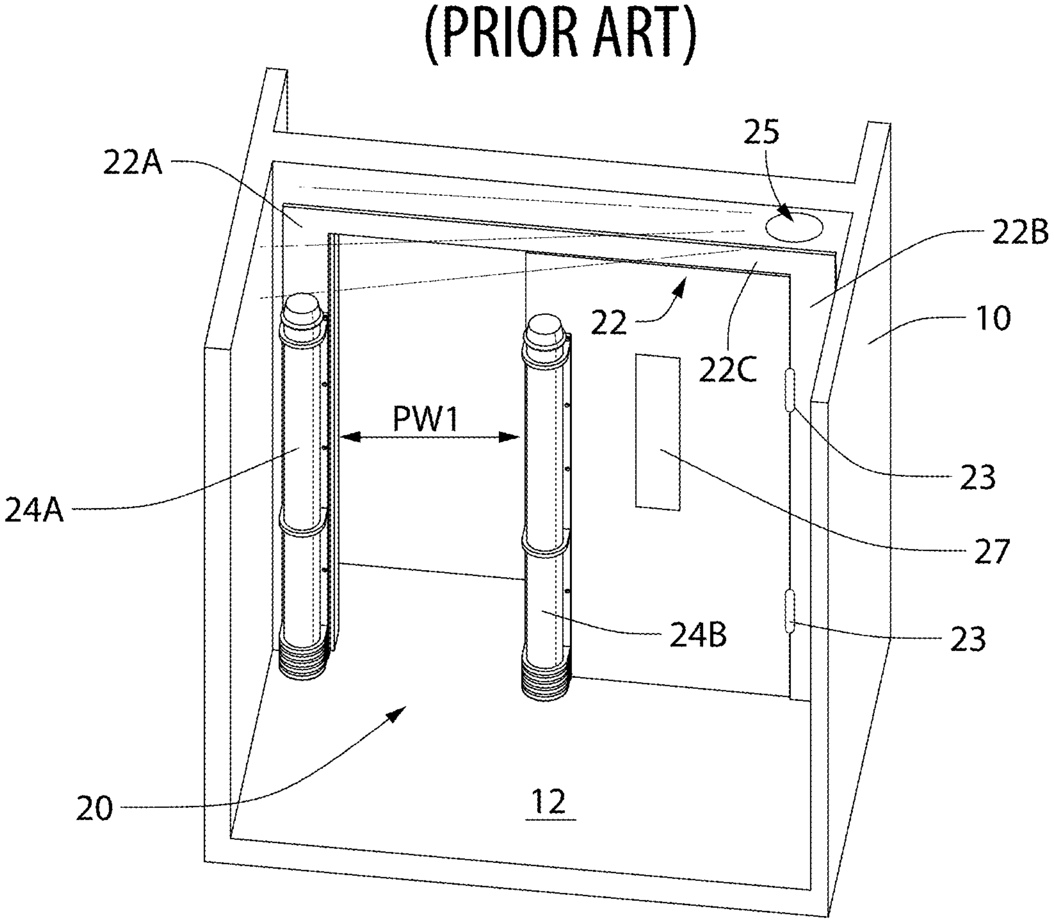
FIG. 2 is an isometric view of the system and method of the present invention including a weapons detector installed at a portal having an open pathway and door that closes off the other portion of the portal.

FIG. 2 (which is an exterior view of the invention 20, namely, the side that a would-be perpetrator would encounter first), depicts the present invention 20 mounted at a portal 10 which comprises an open pathway PW1 and a door D (e.g., a metal swing door, etc.) that is locked in a closed position, as shown therein. The present invention 20 comprises a pair of weapons detection pedestals 24A and 24B, wherein the first detection pedestal 24A is mounted to a first doorway post 22A and the second detection pedestal 24B is mounted to the door D. When these pedestals are energized, a main detection field is formed across the pathway PW1, thus, the pathway PW1 and main detection field are coincident. If a person holding or concealing a weapon walks though the field, the detection pedestals 24A/24B will detect that weapon and immediately alert personnel. Although one pedestal is an emitter and one is a detector, it does not matter if the detector pedestal is located at the first doorway post 22A or on the door D. or vice versa. By way of example only, the two weapons detection pedestals 24A/24B may comprise the OPENGATE™ CEIA Weapon Detector. In addition, a laser scanner 25 (e.g., a BEA laser sensor, etc.) is also mounted at the top lintel 22C to scan the area located above the pedestals 24A/24B. The main detection field (an electromagnetic (EM) field) is confined between the two pedestals 24A/24B. If an assailant were able to hold a weapon above the height of pedestals 24A/24B when passing through the main detection field, the assailant could defeat the weapons detection mechanism; or alternatively, if the assailant simply threw the weapon(s) over the top of the pedestals 24A/24B, he/she could also walk through the main detection field and not set off alarm. Therefore, the laser scanner 25 monitors the area above the pedestals 24A/24B and if something passes through that upper area, the laser scanner 25 will detect the passage and immediately alert personnel, thereby preventing the assailant from circumventing the weapons detector field.

If the pedestals 24A/24B detect a metal object passing through the main detection field, they will transmit a signal to the alarm system and to the automatic door locking system. The alarm system will provide an audible/visual alarm to security and the occupants of the facility. In addition, the signal will also trigger the automatic door locking system to automatically lock all adjacent portals to prevent the perpetrator from any further progression into the facility, as will be discussed later. The EM main detection field is always "on" and as long as the field is "undisturbed" no alarm is set off. As such, whenever the EM main detection field is interrupted, an alarm is set off. In addition, if the door D is opened, that too will cause the detectors 24A/24B to set off an alarm, since the EM main detection field is no longer present. Once the interruption in the field is gone, or the door D is closed again, the EM main detection field is restored in an undisturbed state and the alarm stops.

Figure 8:
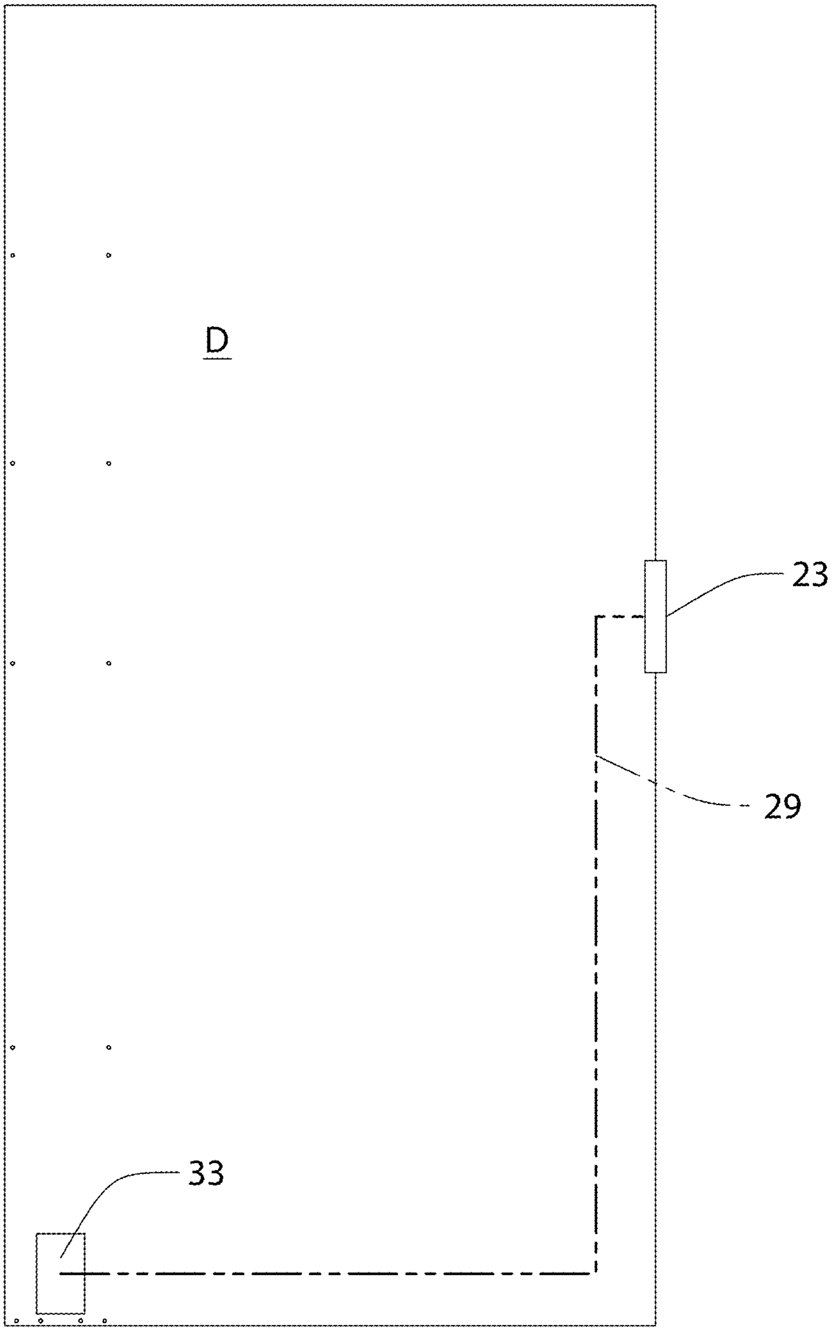
FIG. 8 depicts an exemplary electrical cable run through the door via electrified hinges (not shown) to an access region to connect the cable to the pedestal.
Figure 9:
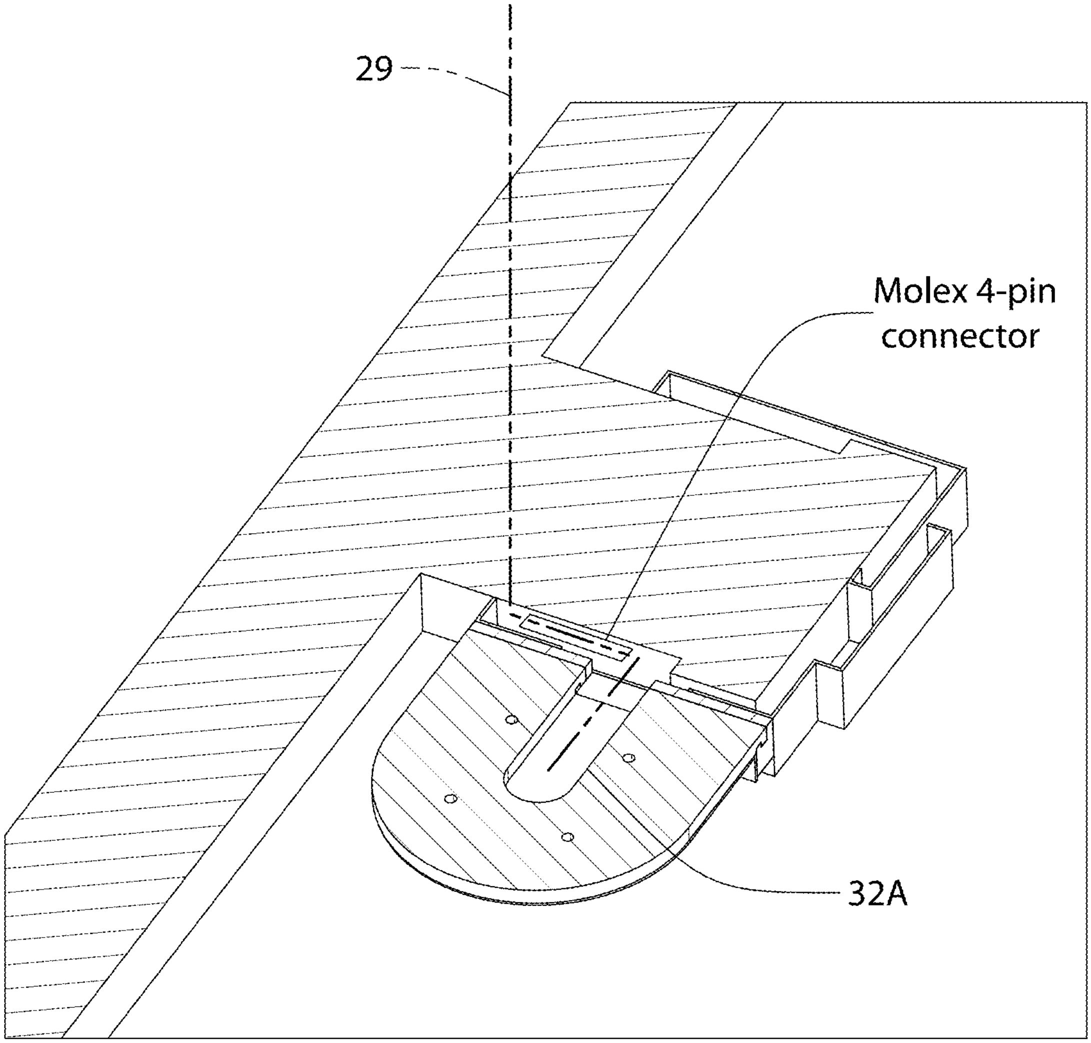
FIG. 9 depicts the electrical cable coupled to a connector at the bottom ring for connection to the pedestal.
Figure 9A:
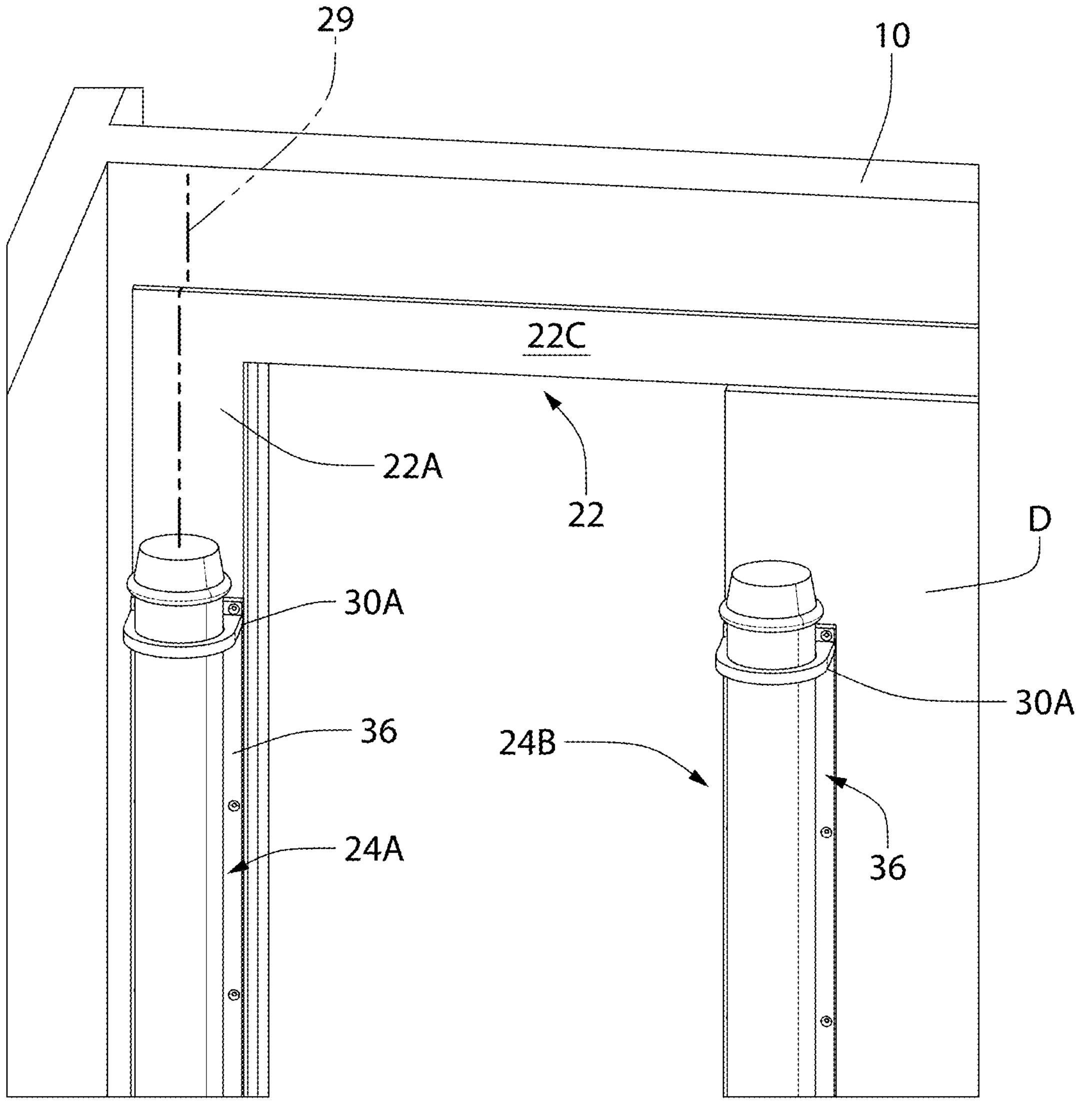
FIG. 9A is a partial top view of the portal of the present invention showing a cable routing through the door frame and into the pedestal mounted on the first post of the door frame.

The frame 22, comprising the first 22A and second 22B doorposts and the lintel 22C, is also part of the invention 20 as it comprises cable runways therethrough to form a cable management system therein for power and data signals to and from all electrical devices, e.g., the weapons detector pedestals 24A/24B, the laser scanner 25, a maglock 28 etc. The maglock 28 (for "magnetic lock" which uses an electromagnet (positioned at the lintel 22C and an armature plate (not shown) mounted at the top of the door D) to maintain the door D in a closed position; the maglock 28 secures the door D during non-emergency situations or threat containment, as will be discussed below. As can be seen in FIGS. 8-9A, electrical cables 29 (e.g., TIA/EIA cables, etc.) are run through the frame 22 and door D; with regard to the latter, the need for "electrified hinges" 23 thus support these cables 29 to provide continuous power and bi-directional signal transmission between the door D and a remote portal controlling and monitoring system RPCMS 54 (see FIG. 3A). As such, the door D is maintained in its closed position (FIG. 2) until approval from personnel (e.g., a security team) or a fire alarm event. The frame 22 is also provided to support the weight of the second pedestal 24B mounted on the door D.

Figure 3:
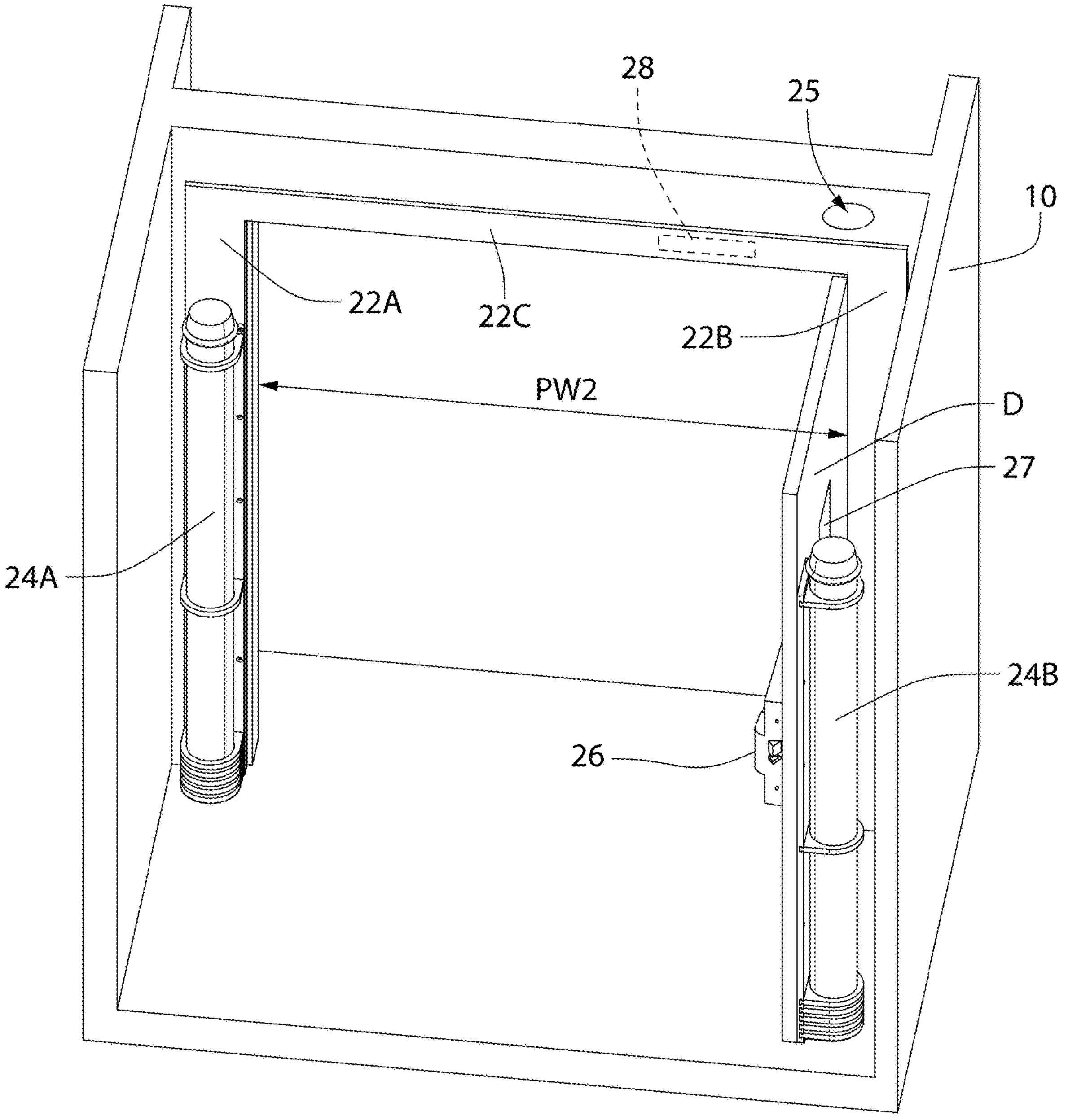
FIG. 3 is an isometric view similar to FIG. 2 but showing the door in an open condition, thereby restoring the full person flow rate through that portal when required.
Figure 3A:
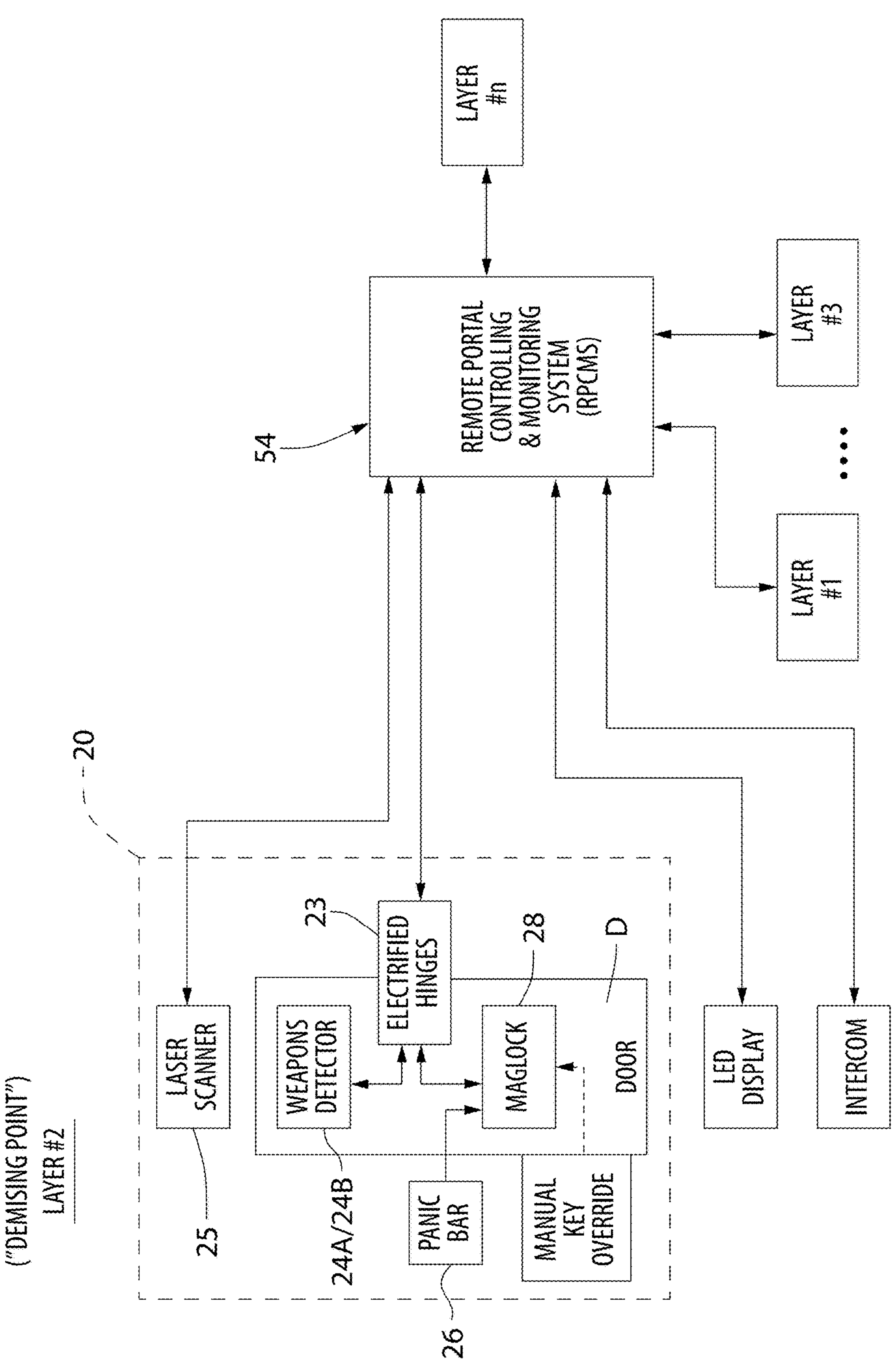
FIG. 3A system diagram for the interface of the electronics in the present invention and the multi-layer protection system.

As also shown in FIG. 3A, the panic hardware 26, when operated by a user, deactivates the maglock 28, thereby allowing the door D (with the pedestal 24B) to immediately be swung open.

As shown in FIG. 3A, a manual key override system is provided that disables all powered components in the invention 20 in case of an emergency or maintenance.

Therefore, at any time an egress emergency occurs, or if, for example, it becomes necessary to pass a wheelchair or a gurney, etc., through the portal and the lane or pathway PW1 is not wide enough to permit passage, the panic bar 26 can be activated to momentarily deactivate the maglock 28 and swing the door D open to enlarge the normal pathway or lane PW1 (or up to the maximum doorway width PW2) to permit passage of a large item therethrough. Once passage of the wheelchair or gurney (etc.) through this enlarged normal pathway has occurred, the door D automatically swings closed, thereby reactivating the maglock 28 and restoring the main detection field as well as the normal pathway or lane PW1.

Securement of the Pedestals 24A/24B to the Door and Doorpost

Figure 4:
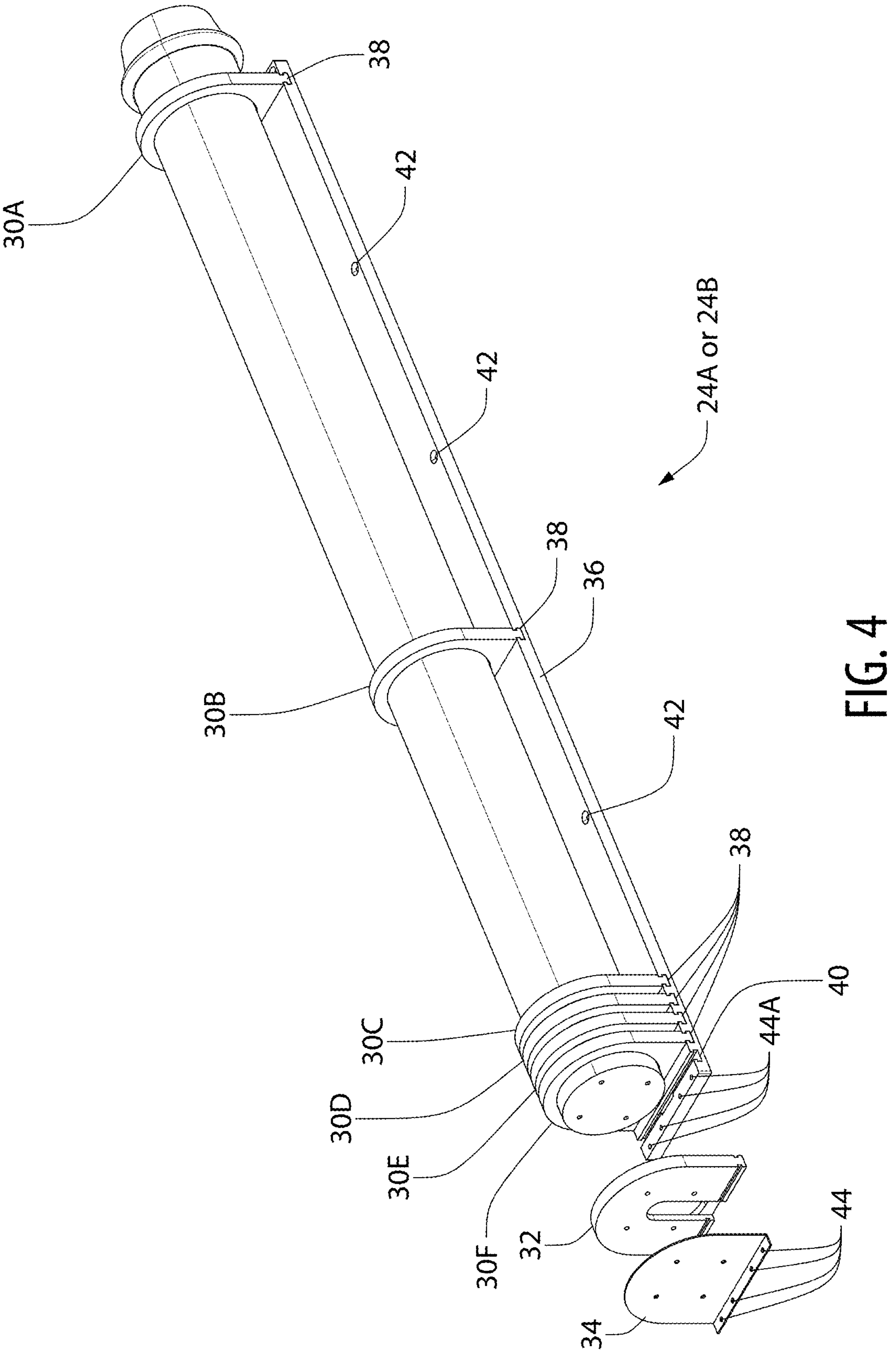
FIG. 4 is an isometric view of one of the weapons detector pedestals showing the various protection rings and backplate for securing this pedestal to either the first post of the door frame or to the door.
Figure 5:
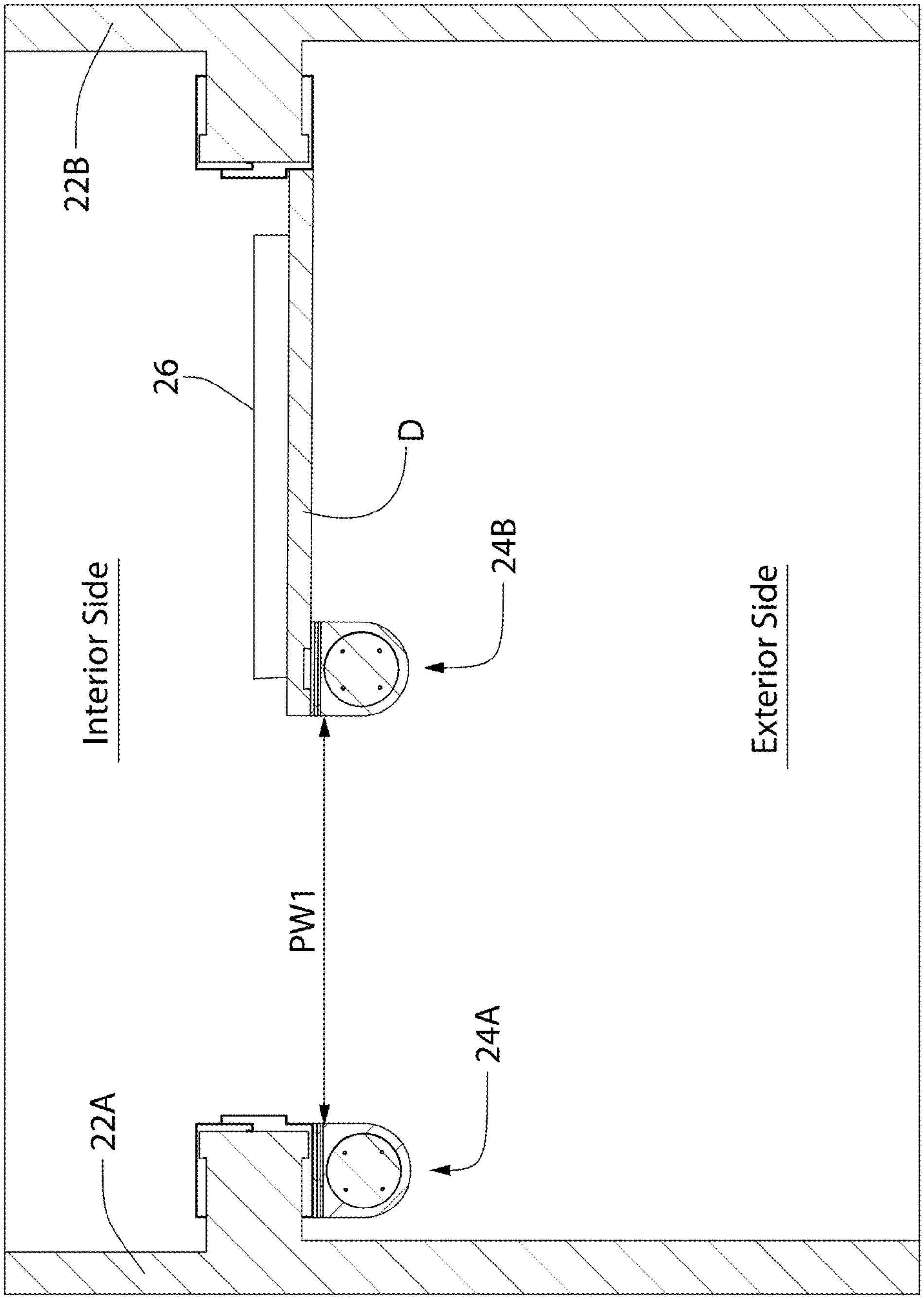
FIG. 5 is a bottom view of the present invention installed at the portal with the door in a closed condition.
Figure 7:
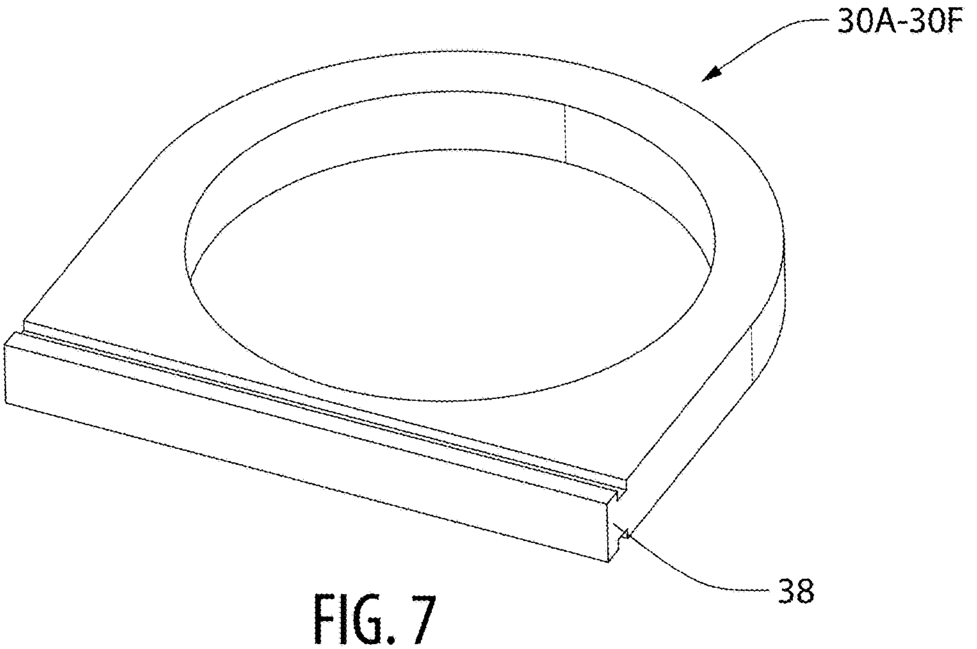
FIG. 7 is an isometric view of a protection ring for the weapons pedestals.
Figure 7A:
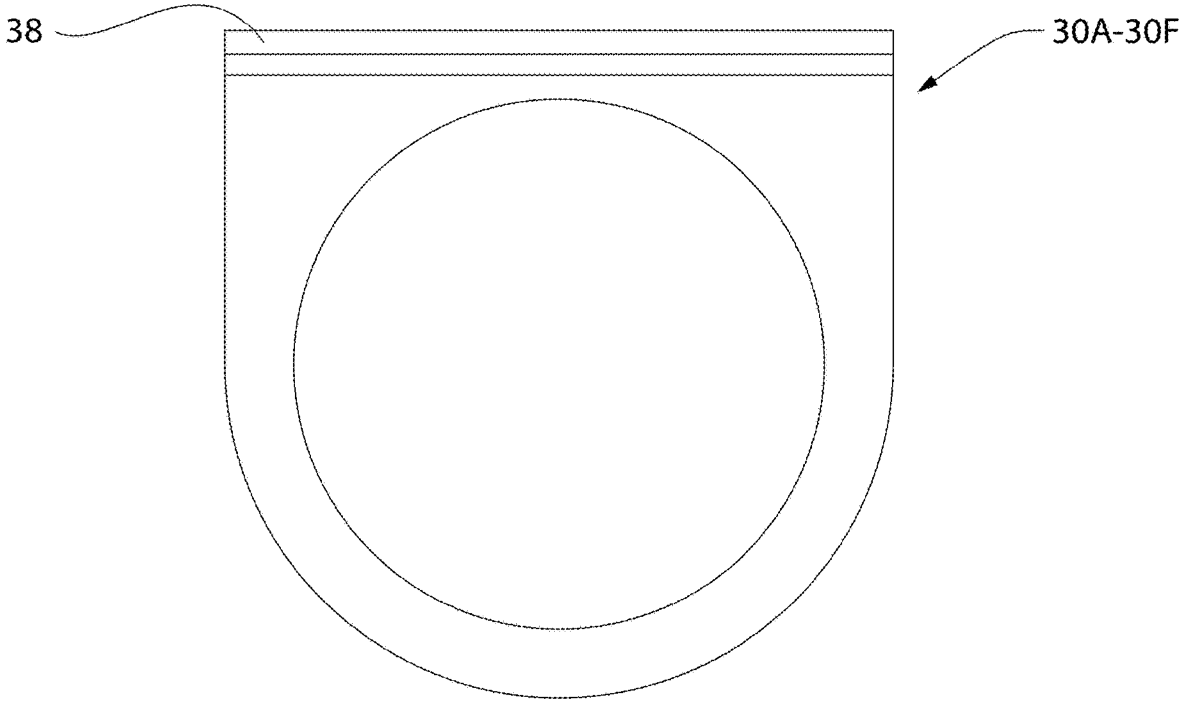
FIG. 7A is a bottom view of the protection ring of FIG. 7.

To ensure that the pedestals 24A/24B are firmly secured to the doorpost 22A and the door D, respectively, while also being stabilized or isolated from any slight movement (which could distort or interrupt the main detection field), protection/alignment ring assemblies and a backplate are provided. FIG. 4 depicts one of the pedestals 24A/24B having the protection ring assemblies securing the pedestal to a backplate. In particular, protection/alignment rings 30A-30F (see also FIGS. 7-7A) secure the pedestal to the backplate 36. In addition, there is a bottom protection ring 32 (see also FIGS. 6A-6C) and finally a metal support plate 34. All of these protection/alignment rings 30A-30F and 32 comprise plastic (e.g., PVC, etc.) to avoid interfering with the EM detection field while also reducing the overall weight of the pedestal 24A/24B, especially for the pedestal 24B that is mounted to the door D. The door D and frame 22 are designed to carry a weight of up to 50 pounds to accommodate the pedestal 24B mounted on the door D. The bottom protection ring 32 is specifically designed for proper cable management (see U-shaped channel 32A) for powering the pedestals 24A/24B as well as data signals, as shown most clearly in FIG. 9. An access panel/opening 33 (FIG. 8) is provided in the door D to permit the cables to be accessed when coupling them to the pedestal 24B mounted on the door D.

The metal support plate 34 provides stability and to support the bottom of the pedestal 24A/24B. The metal support plate 34 is secured to the bottom edge of the backplate 36 through fasteners (not shown) secured through apertures 44 in the metal support plate 34 and down into corresponding apertures 44A in the bottom edge of the backplate 36. The metal support plate 34 also ensures that the pedestal 24B is flush with the bottom edge of the door D.

To avoid the use of the fasteners (typically, metal fasteners such as screws, etc.), each of the protection rings 30A-30F and 32 has a tongue 38 that releasably secures within a corresponding groove 40 (FIG. 4) in the backplate 36. Thus, these rings 30A-30F and 32 can be easily slid over the pedestal 24A/24B itself (from the bottom of the pedestal 24A/24B and upward) and then coupled to the backplate 36 via the tongue 38/groove 40 coupling. The backplate 36 comprises a plurality of apertures 42 for mounting to the doorpost 22A or to the door D.

Figure 1C:
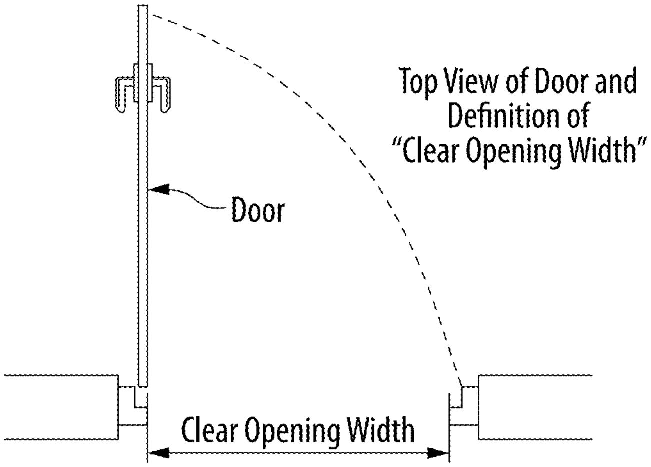
FIG. 1C (PRIOR ART)
FIG. 1C depicts a definition of the term “clear opening width”
Figure 3B:
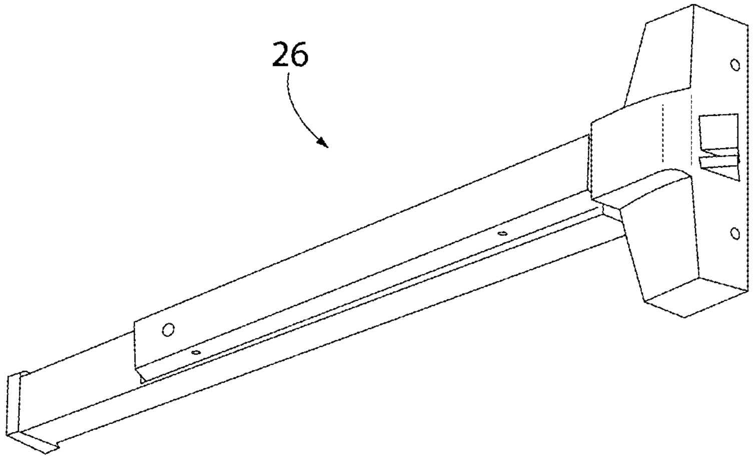
FIG. 3B is an isometric view of an exemplary panic hardware for installation on the door.

The present invention 20 also includes panic hardware 26 (e.g., panic bar; see FIG. 3B; Panic Exit Device, UL Panic rated, ANSI 1, 32 inc. wide by Harney Hardware, etc.) to allow for regular door operation in an emergency where the door D must be quickly opened to permit the maximum daily "path" PW2. As such, this panic bar 26 is located on the inside portion of the door D, as shown most clearly in FIG. 3. This panic bar 26 can override the maglock 28 in an emergency (e.g., a fire alarm event) while alerting personnel that the door D is being opened. See FIG. 3A. So if and when it becomes necessary to use the entire "clear opening width" (FIG. 1C), the panic bar 26 can be used to open the door D, thereby presenting the maximum daily path PW2. And by doing so, there is no need to have to disengage the second pedestal 24B from the floor 12 or other structure to make the maximum daily path PW2 available.

The door D also includes a vision panel 27 (e.g., a transparent glass, e.g., a window) through which occupants can see through. Thus, if occupants on the inside portion of the door D need to evacuate (e.g., a fire alarm event, etc.), they can activate the panic bar 26 to open the door D (having the second pedestal 24B thereon) while making certain that they do not strike someone standing on the outside portion of the door D. Furthermore, it should also be noted that the door D can only be opened using the panic bar 26; as such, there is no handle or grip on the exterior side of the door D that would allow the door D to opened. Instead, the door D can only be opened from the inside (see FIG. 3). As such, door D is labeled "Exit Only; Egress Door."

As such, the first pathway PW1 and the main detection field are coincident. If and when it becomes necessary to use the entire "clear opening width," (see FIG. 1C) the panic/push bar 26 can be used to open the door D, thereby allowing the second larger pathway PW2 to now be available. And by doing so, there is no need to have to disengage the second pedestal 24B from the floor 12 or other structure to make the second larger pathway PW2 available; rather, pathway PW2 is now available along with pathway PW1 so that the entire clear opening width can be used to allow full egress capacity when needed. Furthermore, once the need for the entire clear opening width is concluded, the door D comprises an automatic closing hardware to restore the door D to its closed position (FIG. 2), which immediately restores the EM weapons detection field 10. Thus, when the door 4 is closed, the pathway PW1 comprises a maximum distance of 36 inches, and when the door 4 is swung open in any amount, the egress capacity exceeds 36 inches and when the door is fully opened, the entire "clear opening width" is available for egress.

The remote portal controlling and monitoring system (RPCMS) 54 shown in FIG. 3A, provides the power and data signals to and from various electronic devices for the controlling the portals throughout the facility. One portal controlled by the RPCMS 54 is the present invention 20. Power and data signals are provided to the laser scanner 25, the weapons detector pedestals 24A/24B (through the electrified hinges 23). Besides the present invention 20, the RPCMS 54 controls the maglock 28 for the door 4 of the present invention 20, as well as the maglock of other portals including in layers 1-6 of a multi-layer protection system (MLPS) 100 described later. In some instances, such as layer 1 (i.e., the building perimeter, BP), an intercom and/or an LED display is provided for instruction to the PRE. Although not shown, a card reader and a keypad are typically positioned at the building perimeter BP which interfaces with the RPCMS 54 for permitting or denying access to the building perimeter. By way of example only, one RPCMS 54 that can be used with the present invention 20 and the MLPS 100 is that disclosed in U.S. Pat. No. 7,965,178 (Schmutter) and sold under the tradename PORTAL LOGICS™. U.S. Pat. No. 7,965,178 is incorporated by reference herein in its entirety. The PORTAL LOGICS™ system 54 comprises a programmable logic controller (PLC) and firmware which controls the locking/unlocking of portals in the building, as well as monitoring them and any alarms. PORTAL LOGICS™ system 54 is a universal, highly scalable, and cost efficient smart sensor control system designed for entity management on a day-to-day basis and during emergency operations. PORTAL LOGICS™ hardware 54 is installed on each door or significant building appliance. PORTAL LOGICS™ system 54 can be utilized as a networked area manager.

Figure 3C:
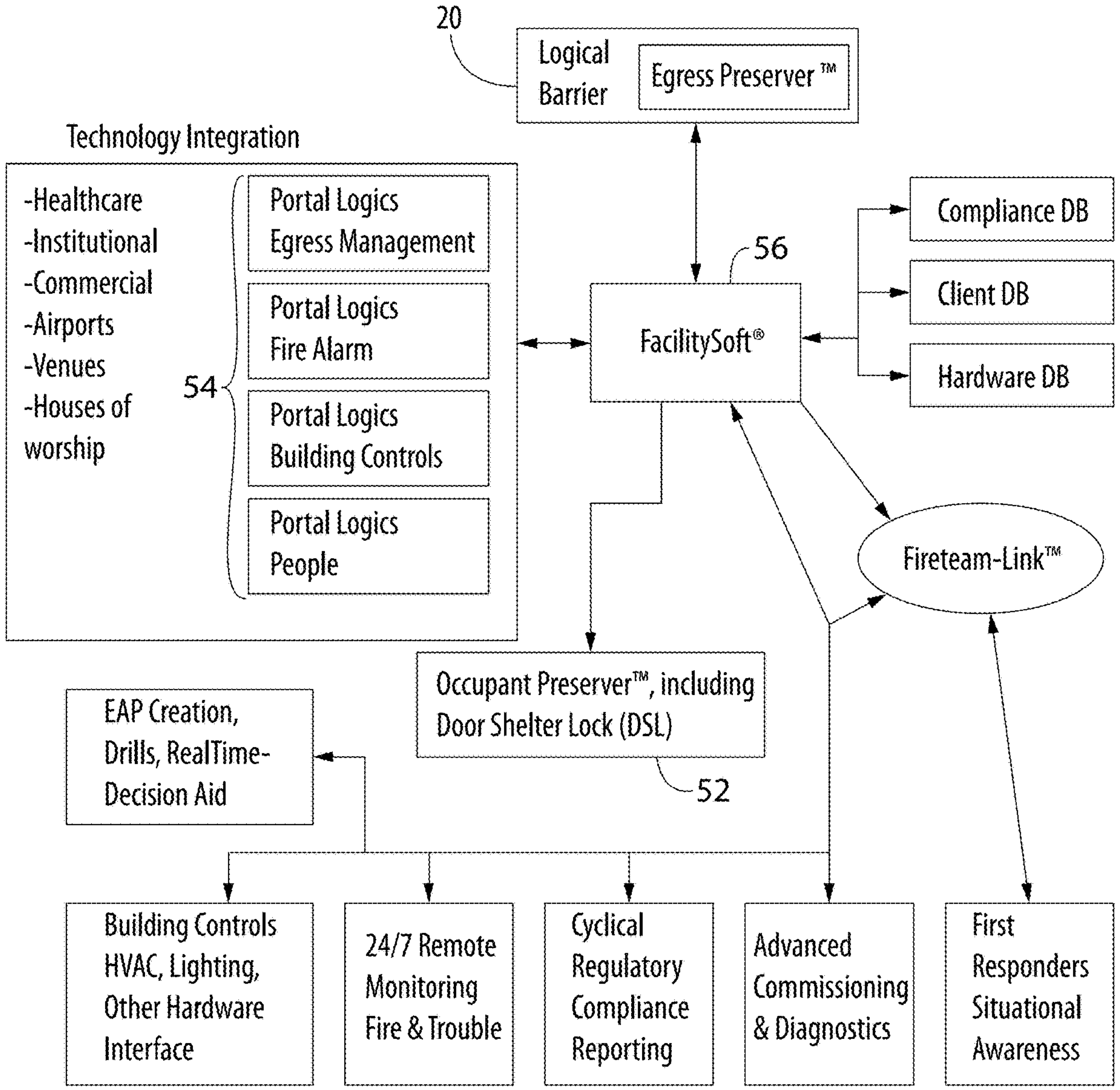
FIG. 3C is a block diagram depicting how the facility governance integration software, sold under the tradename, FACILITYSOFT®, interfaces with building operation/monitoring and first responders.

Also by way of example only, working in conjunction with the MLPS 100 is FACILITYSOFT® software 56 serving as a graphical user interface (GUI) and database for the MLPS 100. FACILITYSOFT® software 56 is entity management software which includes a suite of software tools for entity management that provides 3D interactive, intuitive real-time visualization of the overall structure for both day-to-day and entity duress event management. See FIG. 3C which depicts how the FACILITYSOFT® software 56 provides for facility governance. In particular, FACILITYSOFT® software 56 provides one overall integrated software and hardware structure to maintain and validate building operations and support emergency health and safety actions, while providing effective duress event management. It provides an ongoing real-time decision aid structure that continually analyzes current conditions; it is an effective barrier management to building operations while providing for low maintenance of portals. As further shown in FIG. 3C, FACILITYSOFT® software 56 displays the building's knowledge cross-referenced to an internal compliance database with an intuitive interactive interface. FACILITYSOFT® software 56 also acts 24 hour/7-days/365 days compliance gatekeeper for commercial buildings and structures. The FIRETEAM-LINK™ is a mobile portion of PORTAL LOGICS™ nodes that directly interface the building's knowledge to first responders and provides a virtual team tether.

Figure 13:
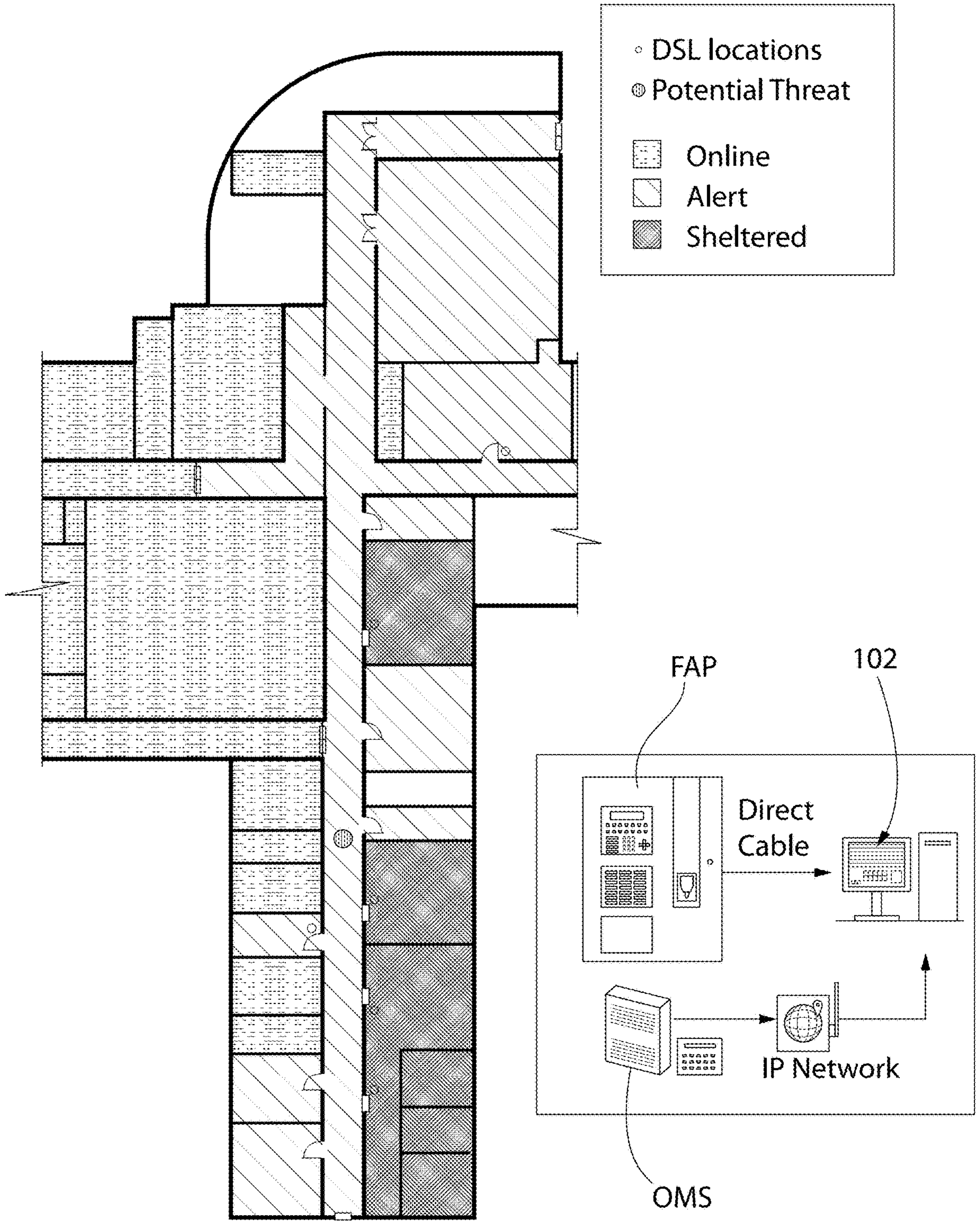
FIG. 13 depicts display formats on an MLPS auxiliary annunciator panel for providing real-time emergency information to building security, first responders, etc., as well as showing some of the sources of the data displayed.
Figure 13A:
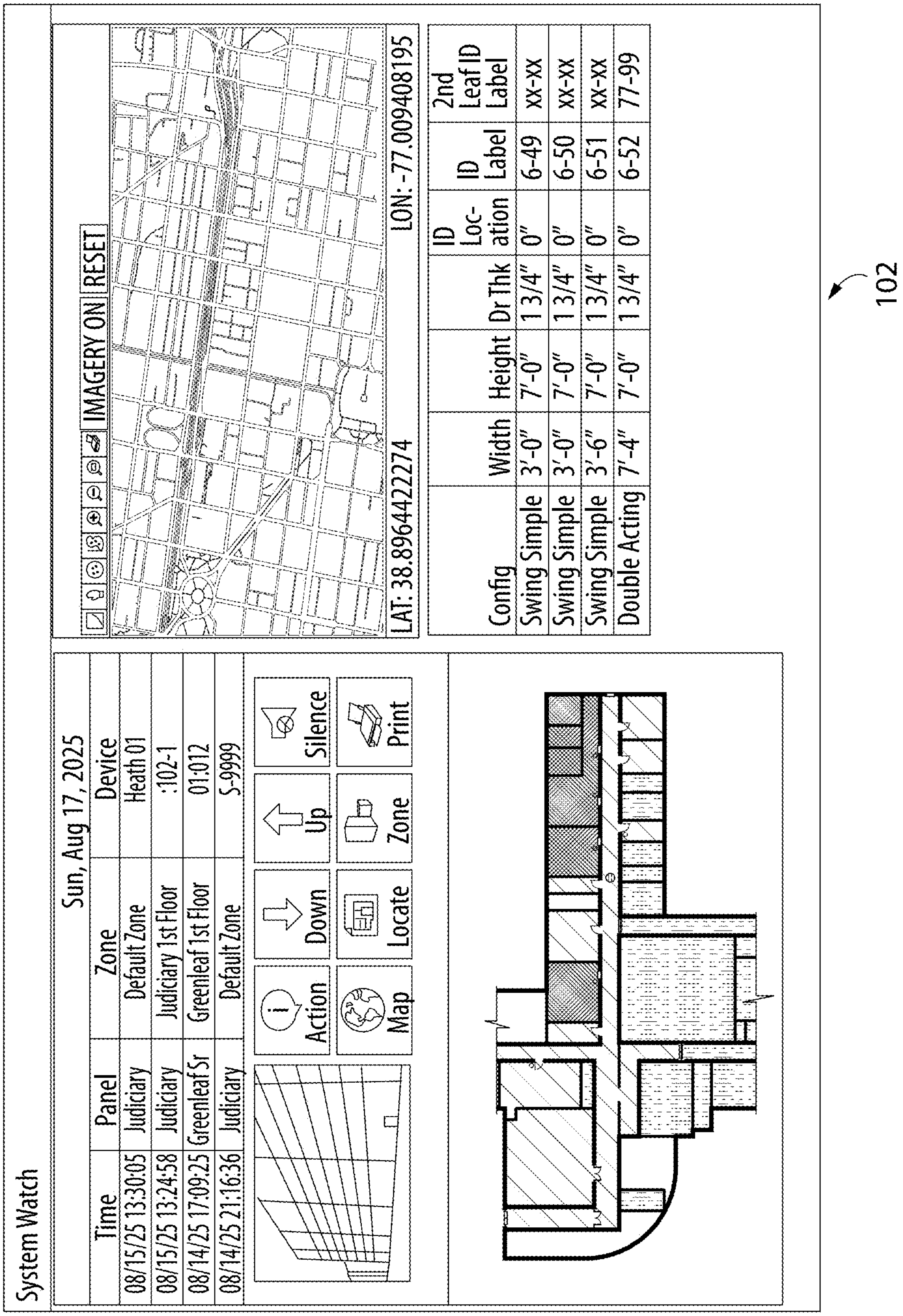
FIG. 13A is an exemplary display of the MLPS auxiliary annunciator panel that provides both macro and micro perspectives of a monitored entity.

All of this data is pulled by FACILITYSOFT® software 56 and a fire access panel (FAP, FIG. 13), as well as other monitoring systems (OMS, FIG. 13) and then formed into an "auxiliary annunciator panel" 102 as shown in FIG. 13 and more clearly in FIG. 13A. This annunciator panel 102 provides building security, fire departments, police departments and any other participants with real-time status about building situations and in different formats that are particularly useful to such users. By culling and presenting all of this status information in this manner, namely providing simultaneous displays of both the macro and micro perspectives of the monitored entity, among other things, several conclusions can be drawn:

(1) The path to safety is not always the path to exit;

(2) The concept of the path to safety is not a static one; and (3) The path is a dynamic concept of the path of least resistance to a deemed-safe area based upon real-time situational awareness.

Therefore, the need to balance the competing interests of providing weapons detection with the originally-intended egress capacity (i.e., maximum doorway width PW2) is achieved by mounting one of the pedestals (24B) on the door D itself while the other pedestal 24A is fixed on the other side of the portal 10. Thus, to incorporate both the main detection field 10 and fire code criteria, the present invention 20 design allows for one of the OPENGATE™ (again, by way of example) detection pedestals to be able to "swing out of the way" in the event of an evacuation. And the door D to which the "movable" OPENGATE™ pedestal 24B is coupled must look and function as any exit door would, which includes use of the panic/push bar 26 operation to open. This panic/push bar 26 does not require any special knowledge and/or third-party action to operate; in other words, any person located on the inside portion of the door D would be able to instantly activate the panic/push bar 26 to open the door D.

Through use of the present invention 20, the hospital's (by way of example only) priority is to maintain a secure perimeter without the need to have a 24/7/365 security staff stationed at the locations. As such, this requires significant camera, sensor and locking hardware integration with remote management. The present invention 20 forms a sensor array that will alert if either the egress door is opened, or an object were to pass through a non-monitored OPENGATE™ weapons detection path.

The invention 20 of the foregoing is sold under the tradename EGRESS PRESERVER™ and it also forms one portion of the multi-layer protection system MLPS 100, as is also discussed farther below.

Occupant Preserver™—Shelter-in-Place (SIP) System 52

Figure 10:
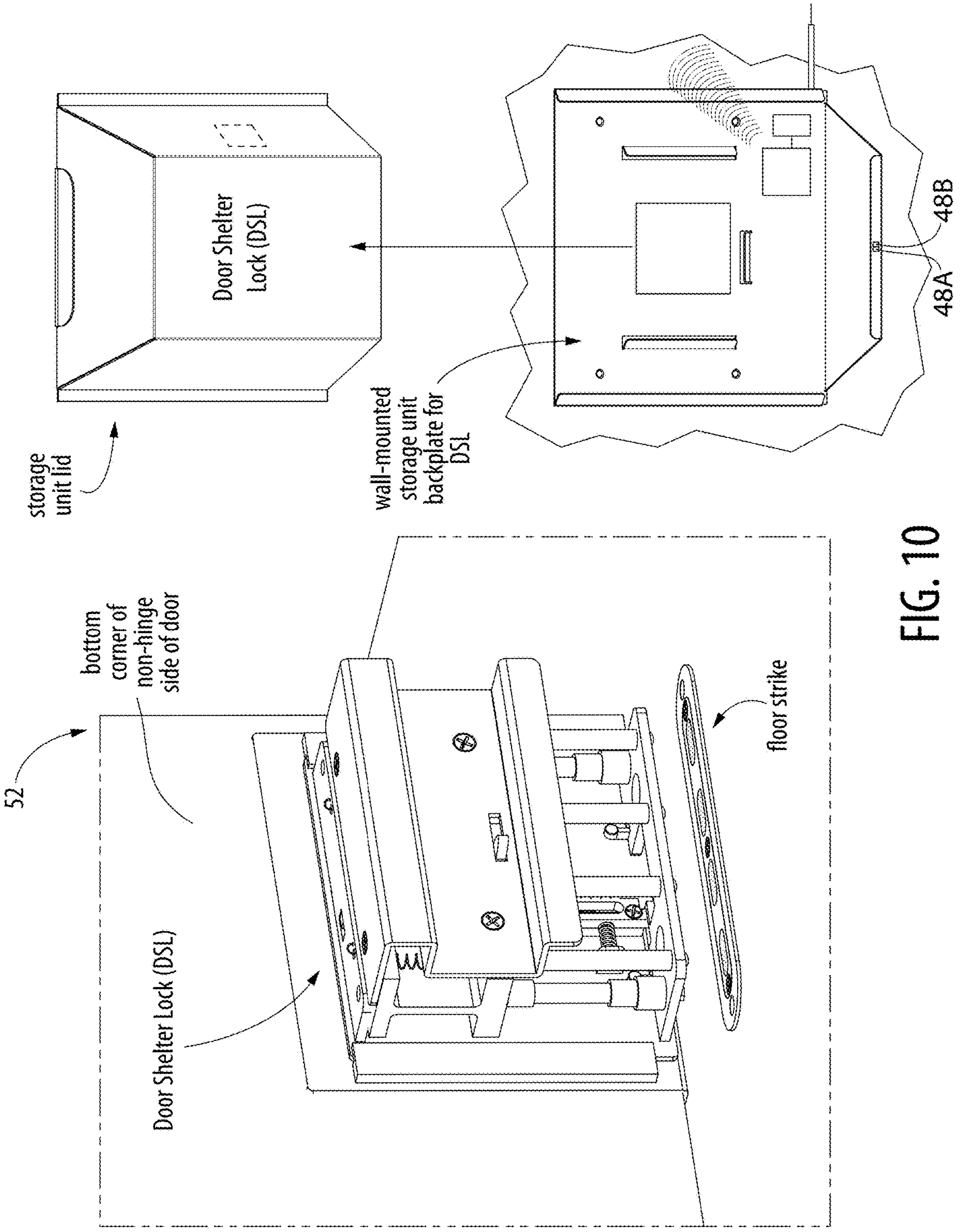
FIG. 10 depicts the door shelter lock (DSL) mounted on the bottom of a door (at a location different than the present invention) after it has been removed, and the cover lifted off of, a wall mount, the DSL and wall-mounted storage forming a protective shelter-in-place (SIP) system sold under the mark OCCUPANT PRESERVER™.

Prior to discussion of the MLPS 100, reference is made to a key component of the MLPS 100, is a shelter-in-place (SIP) system 52 that is sold under the tradename OCCUPANT PRESERVER™, and a summary of which is provided in FIG. 10. The OCCUPANT PRESERVER™ SIP system 52 (the subject of U.S. Pat. No. 12,227,975 which is incorporated by reference in its entirety) comprises a portable door shelter lock (DSL) that is initially stowed within a wall-mounted storage unit and covered by a lid. Should a perpetrator penetrate to layer 5 of the MLPS 100 (discussed later), the RPCMS 54 will activate one of two visual indicator 48A/48B (see FIG. 11) on the wall-mount, thus acting as a "silent alarm" to personnel in the corridor 5 layer and the individual rooms of layer 6. In particular, visual indicator 48A is, by way of example only, a green indicator and visual indicator 48B is, also by way of example, an amber indicator. The green indicator 48A, when illuminated, indicates that the OCCUPANT PRESERVER system 52 in that location is "enabled", i.e., it is ready to be used when needed (this green indicator 48A is also referred to as a "system confidence lamp to confirm the device monitored status). However, when the amber indicator 48B is illuminated/flashing, this acts as the above-mentioned "silent alarm". Upon seeing the visual indicator light 48B illuminated, the individual(s) in that room will close the door, slide the lid off (as shown in FIG. 10) of the wall-mounted storage unit, remove the DSL off of the wall mount and install the portable DSL into a mounting bracket on the bottom edge of the door and then step downward on the DSL, thereby positioning a plurality of locating pins down within a floor strike. That action locks the door shut and should the perpetrator try to open the door using the door knob or even try to shoot the door knob, that will have no effect on the DSL which will keep the door closed. Moreover, the act of lifting the lid off of the wall-mounted storage unit by the individual(s) immediately sends first responders the exact location of that DSL. The visual indicator 48 on the lid thus acts as a "silent alarm" to the individuals who have been previously trained in using the DSL and system. As such, within a few minutes, first responders will be present and the police will be on full notice of just where people have sheltered-in-place. Staff will need to be trained as well as policies developed for the remote door locking procedure as well as fire alarm override. "Piggy-backing" prevention devices will be incorporated and fine-tuned to meet traffic flow requirements.

Multi-Layer Protection System (MLPS) 100

The MLPS 100 is a system and method of prioritizing staff protection in an affordable manner. Applicant has devised a methodology and approach to monitor a next level mantrap to work in concert with the remotely managed metal detection system 20, discussed above. The MLPS 100 monitors both people entering and exiting the building.

It should be noted that the following discussion may discuss implementation of the MLPS 100 in a hospital setting, it being understood that this is only by way example. The implementation MLPS 100 can be in a wide variety of environments. For example, as set forth in FIG. 3C, the MLPS 100 can be just as easily integrated to all kinds of healthcare facilities, institutional/government facilities, commercial/business facilities, airports, houses of worship, and thus, in all kinds of venues.

The MLPS 100 comprises both logical and physical compartments. See FIG. 11. The first clearly-defined boundary (1) is the entirety of the building. The second (2) is a logical boundary that is contained within a portion of a vestibule spanning from the building entry terminating at the metal detector system 20. This is perhaps the most important "defined space" of the MLPS 20 since violation of this constitutes willful intent to violate direct instruction of security personnel.

In designing the MLPS 100 it should be noted that the following goals are meant to be achieved:

- weapon detection for staff entrances;
- unmanned scanning with remote monitoring;
- safeguarding to prevent individual circumvention;
- lockdown system to ensure secure building perimeter;
- maintaining egress capacity for fire/other evacuation;
- maximizing the use of current technology;
- bi-directional communication with OCCUPANT PRESERVER™ system 52; and
- inherent compliance with all related fire codes.

Furthermore, the weapons detection invention 20, discussed above, provides for:

- high volume portable detection;
- intended for onsite continual observation by security personnel;
- additional hand-wanding as needed;
- system provides external alarm output for local/remote alerts; and
- designed to negate small objects like cell phones, coffee tumblers, watches & others to minimize false alarms.

As also discussed previously, the invention 20 configuration comprises:

1. overhead laser sensor 25;
2. detection pattern to ensure no one can circumvent the detector;
3. stationary OPENGATE™ column 24A;
4. metal swing door D for egress;
5. moving OPENGATE™ column 24B mounted on swing door via base-plate;
6. panic hardware 26 to allow for regular door operation; and
7. new door frame 22.

Remote Mantrap Management

If an individual violates that perimeter, it is unknown if it was accidental or intentional. At that point it would be up to the hospital police staff to determine the appropriate course of action. Remote security staff who are monitoring the location will have the option to negate the alarm or to increase the level of warning.

Each threat level of warning shall trigger audio/visual messages that are localized, regional or campus wide. The goal of the MLPS 100 is to ensure that individuals are not allowed to potentially exit directly into harm's way. The MLPS 100 must also balance this approach to ensure that alerts are not unnecessarily issued beyond the localized area. It shall be up to the client and various departments, including public affairs to define various message criteria.

Evaluating "Friend or Foe"

On a high-level basis, when a person requests entry to the building, they are either cleared or restricted entry. The restriction could be temporary or permanent. If the person fails to comply with the verbal instructions given by the remote police officer, it is already determined that there is a certain threat level. The person can then assert a higher degree of threat through verbal or physical actions. Of course, the highest-level threat is with a visible weapon. At that time, the remote officer must make a determination if he feels that the inner perimeter #3 (vestibule) could become compromised.

In concert with PORTAL LOGICS™ system 54 and hospital police evaluation, adjacent OCCUPANT PRESERVER™ system 52 DSLs could be signaled, alerting individuals within perimeter #5 & #6 to shelter. Additionally real-time signage at the end of the corridors alert individuals of the unavailability to exit.

With the establishment of multiple "persons requesting entry" (PREs) and dynamically defined perimeters, the MLPS 100 comprises several layers of protection:

1. entire building perimeter;
2. virtual ring up to the EGRESS PRESERVER™ 20;
3. physical entry vestibule;
4. lobby or other area adjoining the vestibule;
5. corridor or other "contained perimeter" with one or more rooms; and
6. individual room/area that can be sheltered within.

It should be noted that the OCCUPANT PRESERVER™ system 52 can be used on any door other than a staircase or street exit.

Entry Evaluation Process Under the MLPS 100

When a person initiates the building entry process, remote monitoring hospital staff evaluate the entire process from the opening of the outer door to either being granted or denied final access into the interior vestibule doors. Evaluation is based on the following designations:

PRE: person requesting entry

PGE: person granted entry

PRI: person demonstrating intent

PWW: person with weapon

PDE: person denied entry

Individual: any innocent person in the building

The following Table 1 uses a hospital facility setting for defining the various layers of the MLPS 100 (thus, "hyperbaric" refers to the hyperbaric treatment room(s) and CPEP means "comprehensive psychiatric emergency program):

TABLE 1

| Dynamically Defined Perimeters | Possible Action Options |
|---|---|
| 1. Building | a. Ok to enter |
| | b. Entrance unavailable |
| 2. Virtual -Scanning | a. Wait for instruction |
| | b. Ok for scan |
| | c. proceed |
| | d. Further instruction |
| | e. Entry denied |
| 3. Vestibule | a. Ok to exit |
| | b. Scan in process |
| | c. Avoid area |
| | d. Potential high hazard |
| 4. Virtual container of the corridor | a. Ok to exit |
| | b. Scan in process |
| | c. Avoid area |
| | d. Potential high hazard |
| 5. Hyperbaric | a. All clear |
| | b. Avoid area |
| | c. Potential high hazard |
| 6. CPEP ward | a. All clear |
| | b. Avoid area |
| | c. Potential high hazard |
| 7. 200 ft radius | a. All clear |
| | b. Use alternate route (Portal Logics ™; real time signage) |
| | c. Potential high hazard located in xxx |
| 8. Campus (adjacent building alerts) | a. All clear |
| | b. Responder guidance |

The following Table 2 sets forth alert levels for adjacent, regional and building-wide locations:

TABLE 2

| Alert Level | Alert Level Defined |
|---|---|
| Defcon 5 | Door available |
| | Scan in process |
| Defcon 4 | Additional instruction in process |
| Defcon 3 | Initial entry denied |
| | rescan approved |
| | refusal of instructions |
| Defcon 2 | Final entry denial |
| | person leaves |
| | person refuses |
| | demonstrated potential threat |
| | Visible confirmation of weapon |
| Defcon 1 | Inner vestibule compromised: |
| | an individual demonstrating willful intent and obvious failure to comply with security personnel instructions. |
| | active assailant armed with gun or other improvised weapon. |

Door Shelter Via OCCUPANT PRESERVER™ System 52

- code compliant active assailant door shelter management system;
- rides on the fire alarm, pinpointing the XYZ coordinates of a sheltered occupant;
- ensures dynamic control to the occupant to shelter or flee; and
- provides that information to responders with ready access for rescue.

This novel approach allows an individual to shelter in a consistent manner in any designated "safe room". This approach also allows the crucial ability for an individual to have complete dynamic control to "Run, Hide, Rescue/ Resecure or Fight" for the entire event duration, keeping in mind that conditions may change requiring unhindered tactical ability. Analysis is currently ongoing for reviewing the difference from the FD/PD side of a generic "call" of a violent event as opposed to the specific XYZ coordinates of the event epicenter as well as the specific location of sheltered occupant(s).

The design objectives of the OCCUPANT PRESERVER™ system 52:

- understanding the difference between compliant sheltering as opposed to current barricading approach;
- understanding the application of codes & standards;
- understanding of the benefits of a unified approach for both occupants & responders;
- understanding the benefit of Ready Responder Access; and
- understanding of current ability to use smoke/fire as a weapon and the merit of simultaneous FD & PD 911 notification.

In the absence of using the OCCUPANT PRESERVER™ system 52, the following typically occurs:

1. Individuals barricade themselves without responder knowledge & may not be sufficient to keep the intruder out.
2. Depending on item used to barricade, individual may not be able to get out.
3. Wedges, heavy furniture and the like vary on a room-by-room basis and may not be available.
4. Hasty barricade option may require the individual to actively remain in place, thereby leaving them in the line of fire.
5. Barricade devices that cannot be readily opened by responders not only adds significant response time but violates code.

Thus, the current approach suffers from the following:

Dependent upon individual room contents;

No provision for emergency response;

Does NOT provide for remote alert of potential "Hide" shelter event;

Other door mounted auxiliary devices:

can easily be utilized by assailants, bullies or pranksters; and violate hospital, fire and other Authority.

There are also additional fire & life-safety complexities NFPA 3000: Standard for an Active Shooter/Hostile Event Response (ASHER) Program;

NFPA 101®: Life Safety Code®;

NYC & NYS Related Codes: Including IBC & IFC:

doors shall be readily operable from the egress side without use of a key or special knowledge or effort. (on a daily basis); and doors shall permit emergency response access.

Doors shall allow an occupant to shelter-in-place or evacuate in accordance with current conditions as determined by the occupant.

The OCCUPANT PRESERVER™ system 52 design criteria fundamentals are:

An effective emergency action plane (EAP) must allow each occupant to make their own critical split-second decisions to Run, Hide, Fight.

The occupant must be able to secure their perimeter in an immediate and reliable fashion.

One of the key tenets of NFPA Codes is that an individual must be able to determine whether it's safer to shelter-in-place or evacuate.

That said, if responders can't get in, the occupant can't get out.

Not only must the deployment of the device be known upon arrival to the scene, there must be provisions for Responder Ready Access override of the device.

The device design is predicated upon its deployment during a violent event.

Accordingly, the occupant MUST have the ultimate and final ability to remain sheltered.

The Occupant Preserver™ system 52 door shelter lock (DSL) implementation requirements are:

1. DSL is only to be installed by trained individuals;
2. DSL is recorded on the FDNY Critical Information Dispatch System (CIDS) program for both police and fire departments (and which are currently under review);
3. DSL installation is in concert with a training program implemented for all building/facility staff; and
4. DSL is inspected on an annual basis by a trained individual.

The OCCUPANT PRESERVE™ 52 erational instructions are as follows:

1. DSL is stored in its wall mounted enclosure;
2. Opening the enclosure signals remote alarm;
3. Slide device upward for removal from housing (this upward motion is consistent operation for the DSL, namely, "up" for removal, "down" to engage into door and to lock);
4. Lower DSL to engage into the door mounted back plate with locking pins facing down;
5. Depress the DSL by foot/hand to secure the door closed;
6. Utilize RED slide lever for rapid unlocking; and
7. Raise the DSL to disengage and unlock or for self-defense.

The OCCUPANT PRESERVER™ system 52 provides responder ready access via the 1620 key and tactical locational information.

Thus, the goal of the MLPS 100 is to balance daily and event occupant safety, namely, increasing both safety and security for patients/students, visitors and staff for all educational and healthcare institutions nationwide by:

1. Giving occupants the comfort of a clear definitive plan to secure themselves within a designated location;
2. Giving responders the ability to discern where occupants are sheltered and the confidence, they will be able to gain entry to safely evacuate them; and
3. Within the existing Run, Hide, Fight event response model, those who choose to hide will no longer be tasked to utilize furniture/other room contents to secure a door on an ad-hoc basis.

An active shooter/hostile event example follows:

A current/former staff member/unauthorized person enters the facility with a weapon/demonstrating willful intent. The remote hospital police officer issues a "Defcon" alert. Occupants make individual determination to Run, Hide, Fight in accordance with their prior training and established emergency action plan. Where feasible, occupants evacuate. Alternatively, staff utilize their training and make best efforts to gather visitors and other occupants to one of the designated shelter-in-place areas. Those occupants then deploy the OCCUPANT PRESERVER™ system 52. Remote alarms sound and signal location information. A proportional response is determined. The gunman targets any exposed potential victims and attempts entry into various rooms. However, upon arriving at a door where the DSL has been installed on the door, the gunman is deterred by the OCCUPANT PRESERVER™ system 52. The occupants continue their individualized decision to Run, Hide or Fight. Responder (e.g., armed authorities) arrive on scene and gunman is neutralized (e.g., either caught, killed or commits suicide). The responders sweep the floor, prioritizing locations based upon the remote alarms received via the OCCUPANT PRESEVER™ 52.

A second scenario: an active assailant in the audiology department.

1. Assailant enters the building undetected;
2. Assailant pulls the manual fire alarm box in the audiology waiting area;
3. Pull station reports to the fire alarm system;
4. Fire alarm system transmits the signal to central station and the printer output or equivalent;
5. FACILITYSOFT® software 56 reads the printer output or equivalent captures the data but stores the info only;
6. Nursing staff see the assailant and initiate shelter within the nursing lounge;
7. OCCUPANT PRESERVER™ system 52 DSL cover is lifted and sends signal to FACILITYSOFT® software 56;
8. FACILITYSOFT® software 56 cross-references this new data to the already received pull station report from the primary panel;
9. FACILITYSOFT® software 56 transmits to central station;
   a. Previous pull station report revised;
   b. Smoke/fire potentially being used as weapon;
   c. Assailant event reported to PD with the exact location of the sheltered occupant;
   d. Event is sent to EMS as well to maximize the golden hour;

10 FACILITYSOFT® auxiliary annunciator panel 102 provides ongoing intel for unified command as various responder departments/agencies enter the building;

11. Fire life safety director (FLSD) is able to disseminate situational updates with locational information as the event continues to evolve;

a. Responding companies (FD & ESU) will have already been trained on the FACILITYSOFT® annunciator panel 102 so they would be able to utilize the data on their own;

b. Overall, the incident commander would have the right to be the primary decision maker as to what date is disseminating to other building occupants;

12. Smoke detector goes off in the 4th floor storage closet;

13. This information is immediately given to all. Units on scene as well as transmitted to central station;

a. This is significant as the assailant has now ignited flammable/hazardous materials and PD special force units need this information in real-time;

14. Locational information provides the valued intel to NYPD ESU and threat is neutralized;

15. FD is given the green light to extinguish the fire; and

16. Event is terminated,

A non-assailant event scenario is also provided: A grease fire in main kitchen

1. Flames ignite from the back of the hood;
2. Kitchen fire suppression system activates;
3. Suppression system sends signal to fire alarm system;
4. Fire alarm system transmits the signal to central station and the printer port;
5. FACILITYSOFT® software 56 captures the data but stores the info only;
6. FLSD remotes into FACILITYSOFT® software 56 and captures a screenshot of the floorplan and provides this to security so they are prepared for FD arrival and have all related doors opened for them;
7. Fire is extinguished; and
8. Event terminated.

Thus, the significance of the OCCUPANT PRESERVER™ SIP system 52 is:

safeguarding building occupants while lowering daily anxiety and providing them a repeatable model by which to shelter;

safeguarding responders by reducing the ability to use smoke/fire as a weapon;

advancing tactical information BEFORE arrival of both fire department (FD) and police department (PD);

unifying disparate departments of emergency medical services (EMS), FD and PD with a singular information point, that being the fire alarm panel which displays BOTH normal fire associated devices and X-Y-Z coordinates of sheltered occupants.

A third scenario is based upon an actual active shooter event whereby the lobby staff had no ballistic protection and where alarm management was staff dependent with additional failures within the public address (PA) system. Based on that event, the following operation of the MLPS 100 would have resulted in the following positive output.

FACILITYSOFT® software 56 would automate annunciation directly though the amber indicator 48B on the wall-mount of the OCCUPANT PRESERVER™ system 52, alerting individuals in that room to take action by lifting the cover (FIG. 10) off the wall mount, removing the DSL from the wall mount and installing it within the mounting bracket at the base of the door. Individuals trained on use of the OCCUPANT PRESERVER™ system 52 affords the individual the confidence that they can shelter in any location in the same repeatable manner; this is in contrast current active shooter training based on site specific room content which brings no daily comfort to individuals nor does it provide an actual solution during such an active shooter event. Moreover, in the actual event, little or no information was provided to the tenants. In contrast, in the MLPS 100 of the present invention, the two indicators 48A/48B discussed previously, provide the individuals with important information. In particular, with the green indicator 48A lit, the individual(s) can rest assured that the OCCUPANT PRESERVER™ system 52 is "ready to go" when needed. On the other hand, if the amber indicator 48B is illuminated or flashing, this acts as a remote alert advising/signaling the individual(s) to shelter. As such, the third scenario would occur as follows:

1. An armed person enters the building.
   a. A possible third-party reports the armed man to SOC (security operations center) via 911, central station or other credible means.
2. Automated weapons detection is incorporated through the MLPS 100.
   a. AI (artificial intelligence) cameras; and
   b. Integrated metal detectors via PORTAL LOGICS™ system 54, EGRESS PRESERVER™ weapons detection system 20 or other methodologies.
3. All tenants are notified.
4. Floor by floor implementation of pretrained emergency action plan (EAP).
5. Staff relocates to pre-established "safe rooms".
6. Room by room deployment of the DSL in 5-10 seconds per location:
   a. Each area secured and staff members are off the X;
   b. No further action is required as authorities are already notified of both the event, as well as the precise location of the sheltered individuals; and
   c. Sheltered individuals are advised to stay off their phones, breathe and be aware of their surroundings.
7. SOC (security operations center), FLSD (fire life safety director), Central Station & 911 are alerted to each shelter locations.
8. 3D floorplan images are transmitted, allowing for streamline/proportional response.
9. Unified response to: stop-the-killing, stop-the-dying and maximize the "golden hour".
10. Gunman is neutralized (caught, killed or commits suicide).
11. Medical response is prioritized utilizing the 1620 key and NYPD Emergency Services Unit (ESU) taking the lead.
    a. Ready access to each area sheltered via a DSL; and
    b. Additional focus is paid to locations known to have handicapped/medically challenged individuals.

Figure 11:
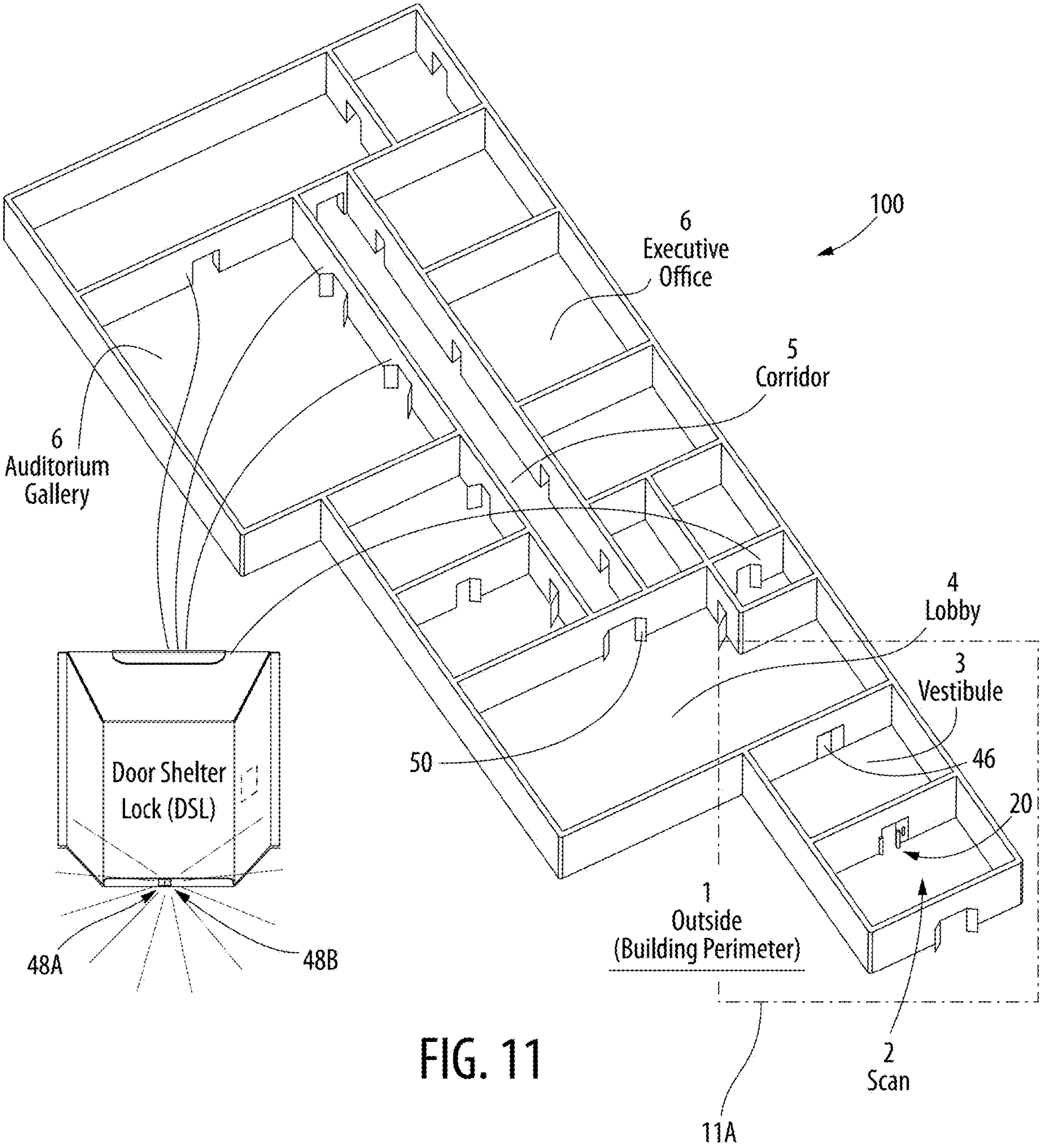
FIG. 11 shows the system and method of a plurality of layers of protection for a facility using the present invention with other protective devices.
Figure 11A:
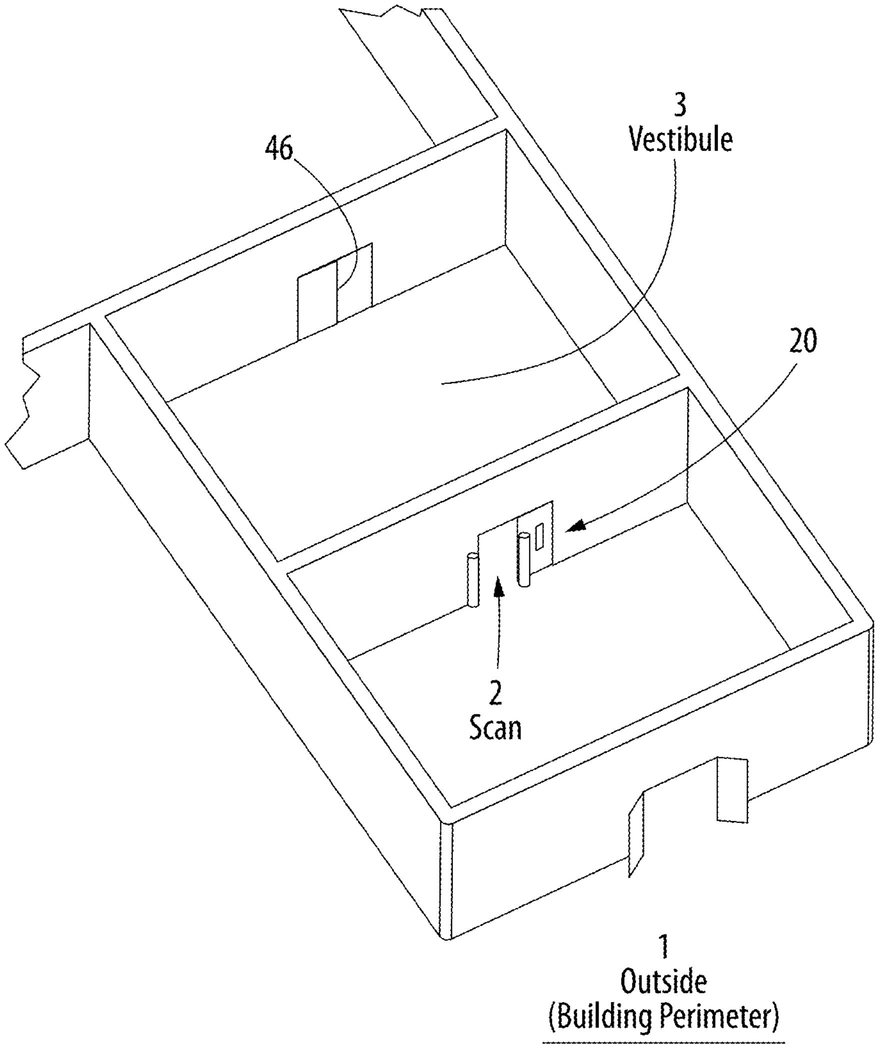
FIG. 11A is an enlargement of the "scan layer" and the "vestibule layer" of the plurality of layers of protection.
Figure 12:
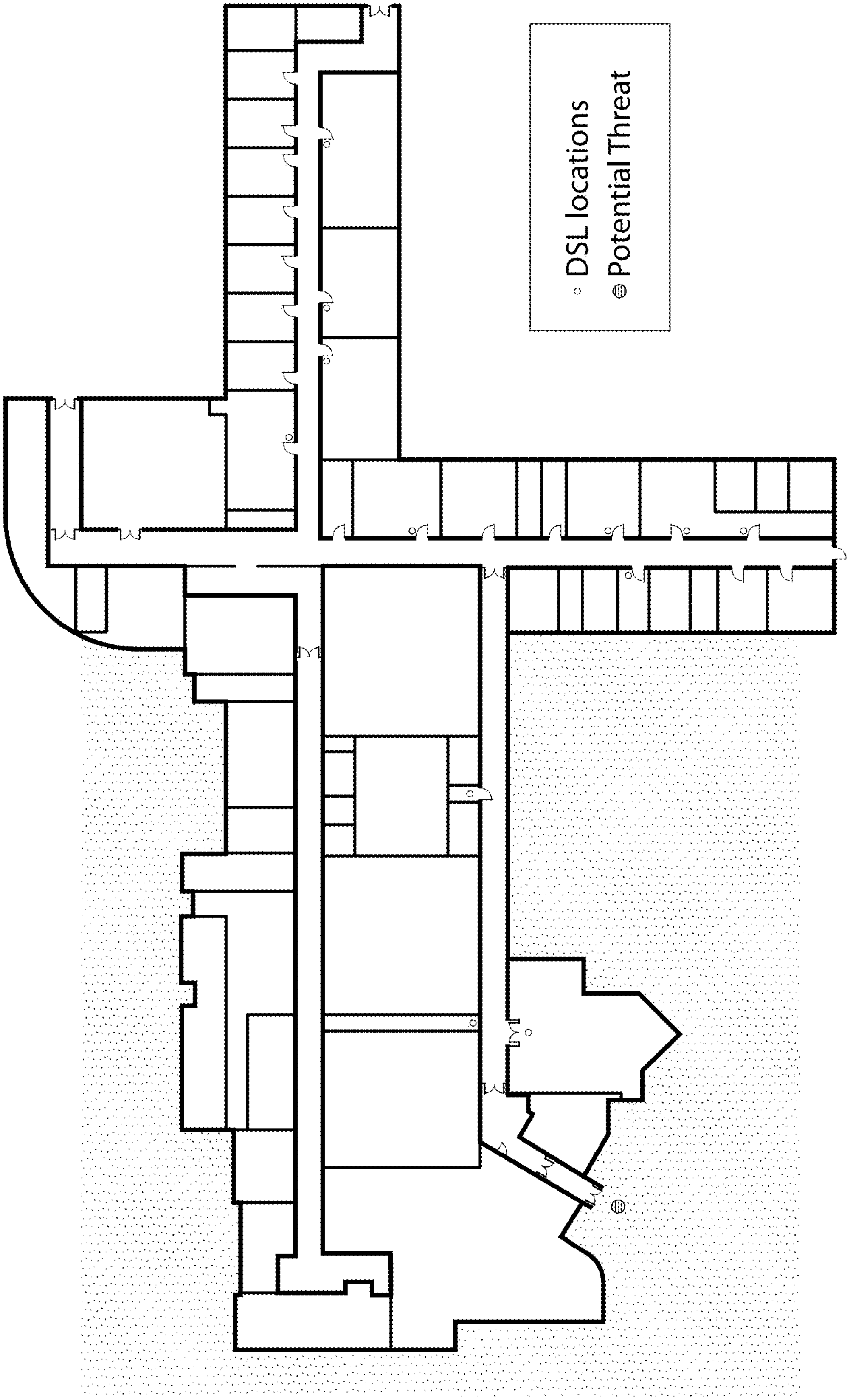
FIGS. 12-12D provide a scenario showing how a perpetrator can be stopped and/or personnel warned/directed to alternate routes to avoid perpetrator and/or directed to shelter-in-placing using the DSL at different layers of protection in the multi-layer protection system.
Figure 12A:
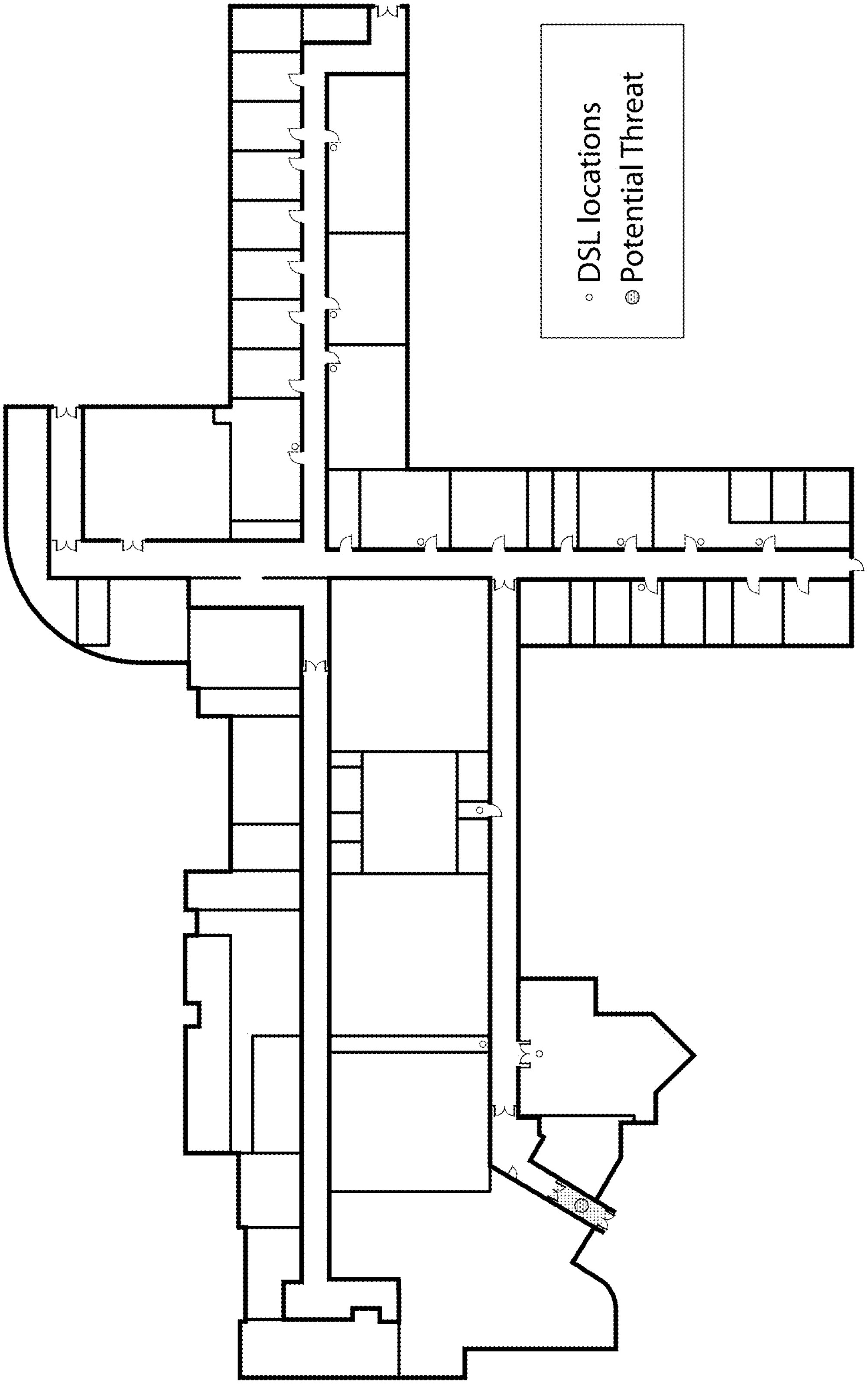
Figure 12B:
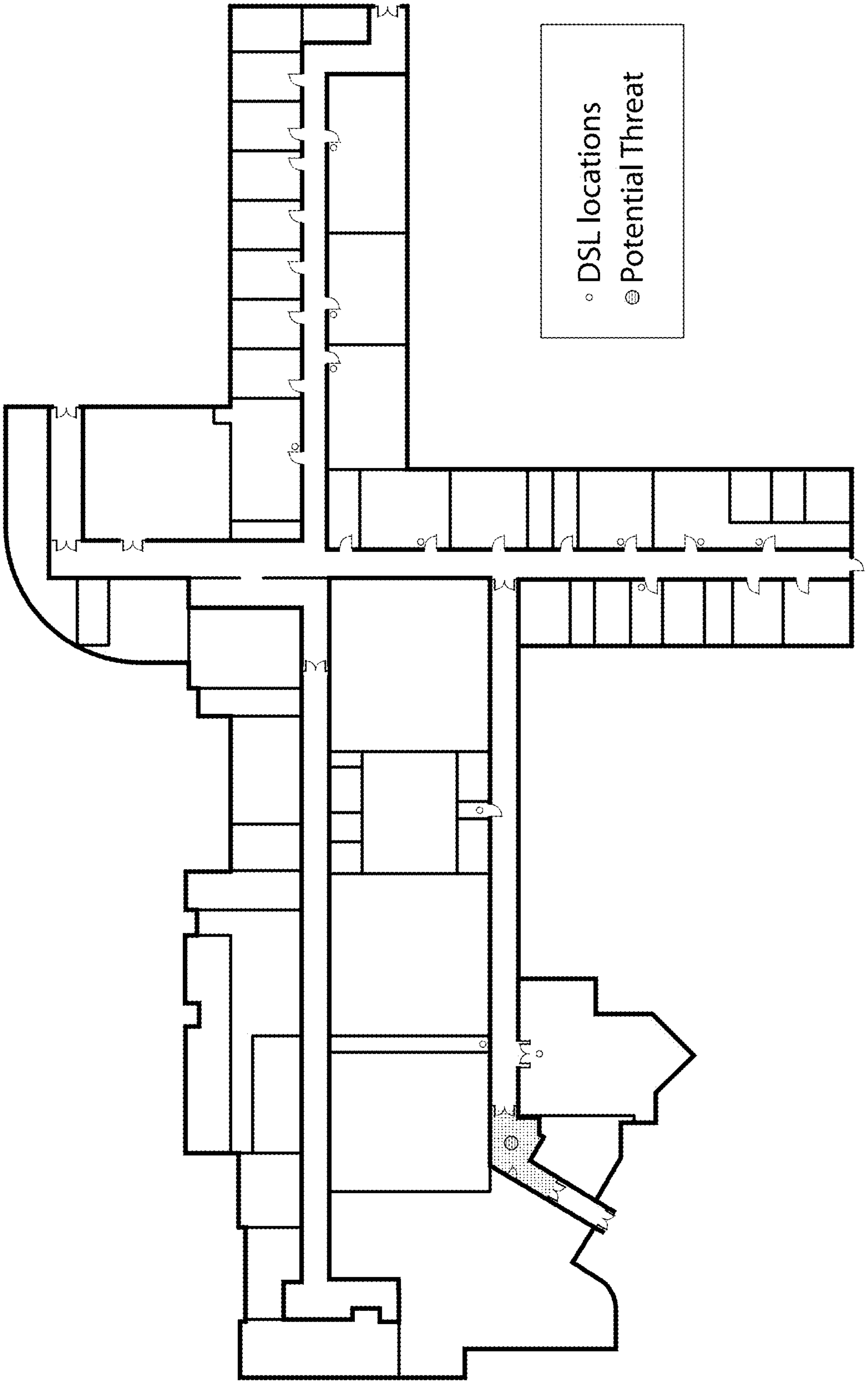
Figure 12C:
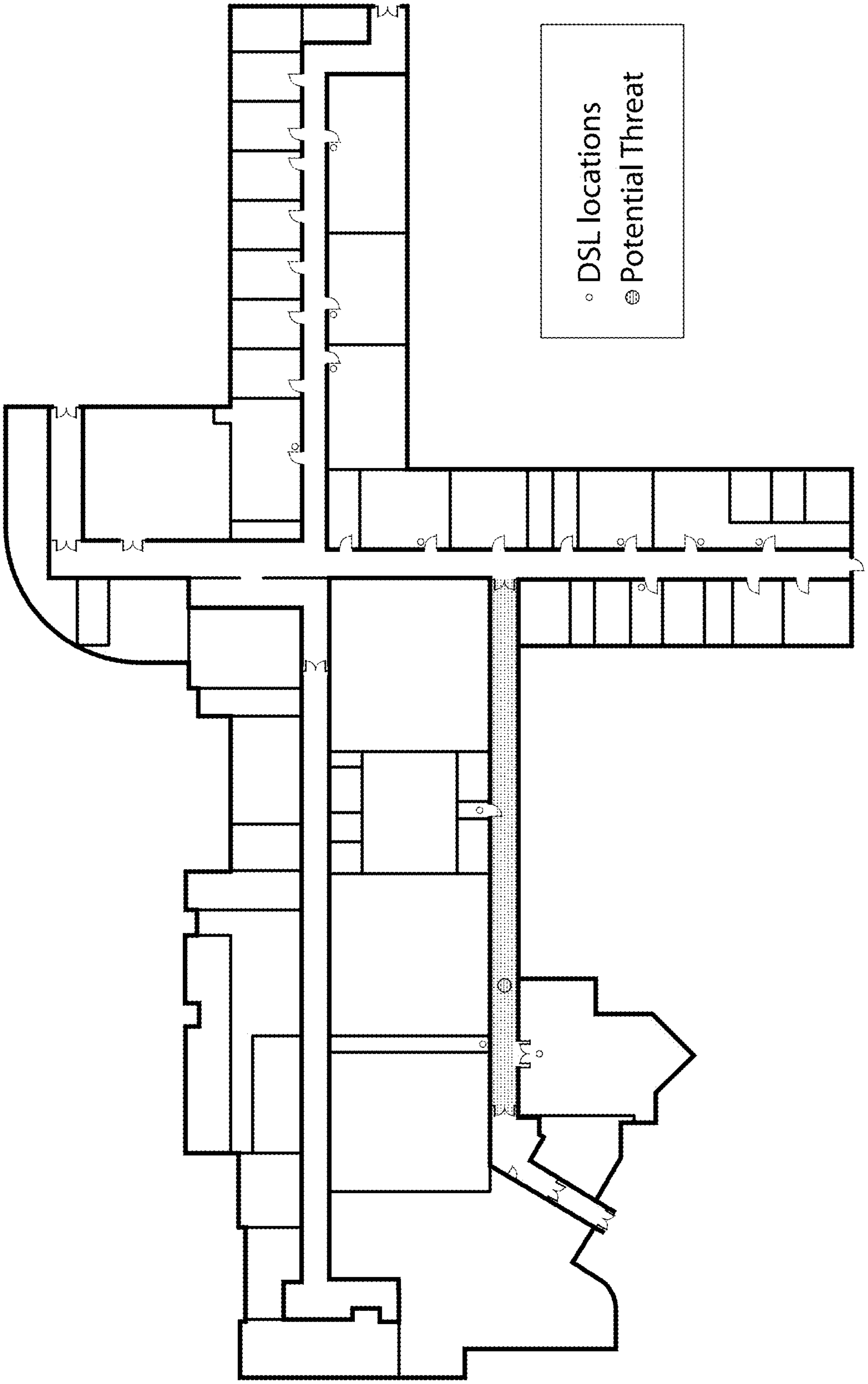
Figure 12D:
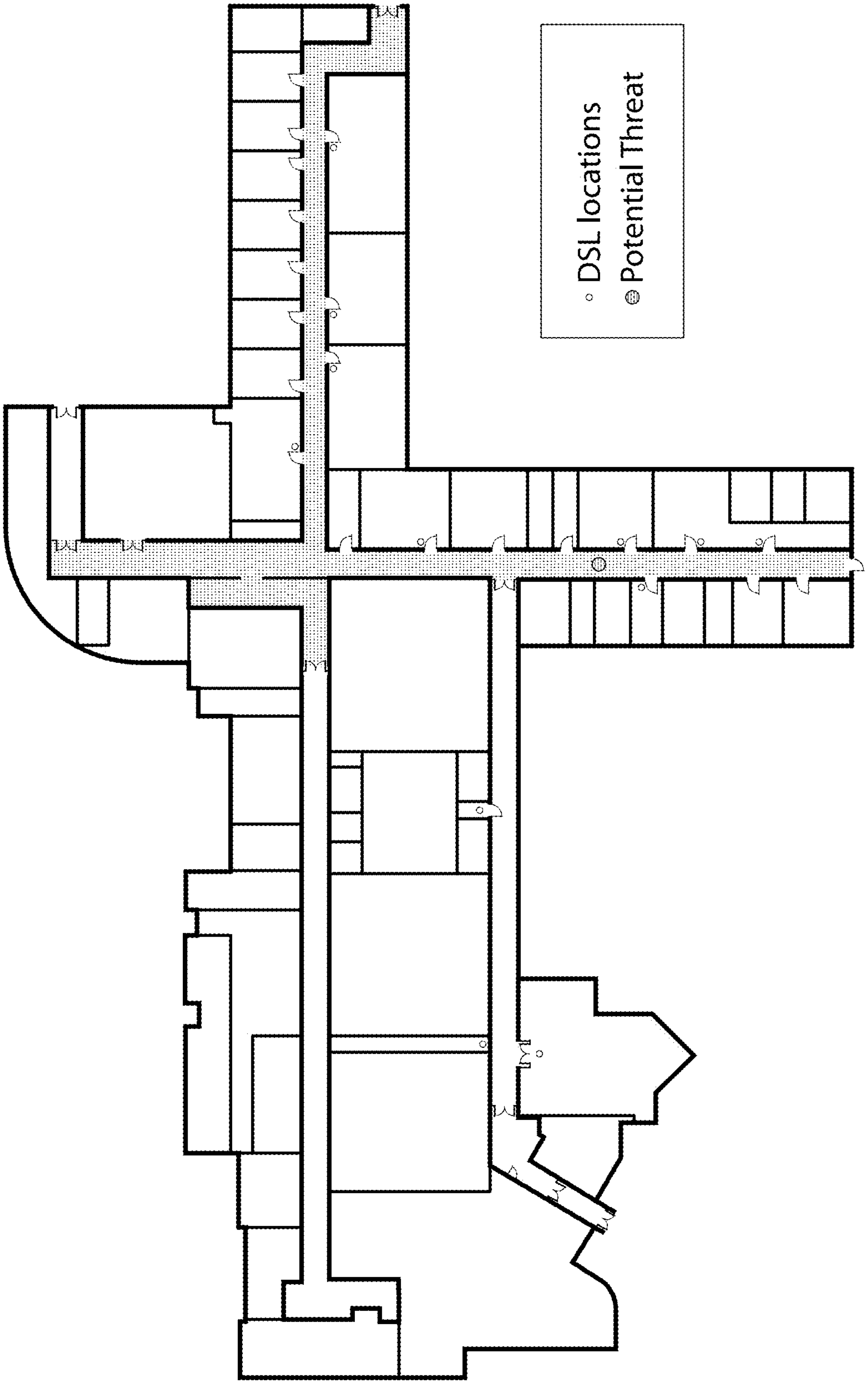

Multi-Layer Protection System (MLPS) 100 IN VIEW OF FIGS. 11-12D

The invention 20 forms a "demising point" in this multi-layer system 100 whereby a person requesting entry (PRE) is scanned thereat to become either a person allowed entry (PAE) or a person denied entry (PDE). If a weapon is detected on a perpetrator at that location by the invention 20, adjacent portals will remain locked to prevent the perpetrator from any further entry into any of those adjacent portals while preventing occupants on the other side of these portals from coming into contact with the PDE. See FIGS. 11-11A and 12-12D.

It should be noted that the term "individual" as used throughout this Specification refers to the people in the building who are to be protected and does not cover a "perpetrator", an assailant, a PRE, a PRI, a PWW or a PDE (all defined above). As such, the term "individual" excludes the PRE, PRI, PWW and PDE.

The MLPS 100 comprises multiple defendable (or "secured") perimeters that provide for the prevention of a PDE from going "any further" if specific safety criteria are not met. But at the same time, the MLPS 100 also prevents occupants from encountering a PDE by preventing them from moving towards the PDE, by maintaining normally-locked doors in a locked state and providing real-time signage informing occupants about what is going on and/or providing alternate pathways or instructing them to shelter-in-place. Thus, the MLPS 100 comprises "bi-directional" layers of defense. As such, the occupants are always led away from higher harm environments to lower harm environments, and never in the other direction.

By way of example only, there are six perimeters or layers and they are labeled "1" through "6". Looking at FIG. 11 (and FIG. 12 to the far left), the first level (layer 1) of protection is positioned at the building perimeter (BP), e.g., an outdoor portal. This is typically the card reader that a person would swipe or present a card in proximity to a card reader; or, alternatively, it could be a keypad requiring the person to enter a proper passcode to enter. As such, this layer 1 of protection can prevent a perpetrator from even entering the building. Layer 1 is a "physical" layer of protection because it literally prevents a PRE from entering if he/she doesn't know the passcode or have the card; without those the PRE is physically barred. However, if the person somehow is still able to enter without having either swiped a card or entered passcode (e.g., another person who did present a card to the reader or punched in a proper passcode inadvertently, or intentionally, allowed the person to pass the BP level of protection), there are other layers of protection.

Upon arriving at layer 2 (FIG. 12A, at far left), the PRE will now be scanned by the invention 20. If a metal object is detected by the pedestals 24A/24B, or the laser scanner 25 is interrupted, the RPCMS 54 will maintain mag locks 28 in the doors 46 at layer 3 in a locked condition (the doors 46 are always in a locked condition), the vestibule 3 (FIG. 11). This not only prevents the PRE from passing beyond the vestibule 3 but it also prevents innocent occupants from entering the vestibule (thus, a "bi-directional" layer of defense); thus, this will prevent an occupant from coming into "harm's way" during a potential weapon detection incident. Should the PRE become a PGE, then the doors 46 of the vestibule 3 are unlocked to permit passage of both the PGE and the occupants.

Since the main detection field is a metal detector, the PRE will then be instructed (over and intercom) to go back through the main detection field to determine if it is a false alarm. At this point, the PRE becomes a person requiring a rescreening (PRR). If the PRR obeys the instruction and goes through the main detection field again and no alarm occurs, then he/she is considered a person granted entry (PGE). In on the other hand, the alarm is set off again, the PRR becomes a person denied entry (PDE). And he/she will be confined within the vestibule, layer 3. Additionally, if the PRR refuses to obey the rescreen instruction, then the PRR becomes a person refusing instruction (PRI) which is the same status as a PDE and again is confined to the vestibule 3.

The PGE may proceed through the doors of the vestibule 3 and into the lobby 4 (FIG. 12B). It should be understood that sometimes a "perpetrator" may manifest after passage through a few layers of protection. For example, the person may have had an entry card, or was authorized to have the passcode to get through the layer 1 BP level of protection, and may have had no weapon on him/her and so passed through the second layer and third layer and is in the lobby layer 4. But maybe this person then gets into an argument with someone and then decides to use a chair or other item in his/her vicinity as a weapon. At that point, security (or, if a security guard is present at that location) can be alerted and a silent alarm automatically flashes a visual indicator 48B (see FIGS. 10-11) on the wall-mount of a door shelter lock device (DSL), as is discussed next.

Layers 5 and 6 of the MLPS 100 involve a corridor and suites of individual rooms, respectively. Should a perpetrator penetrate to the lobby layer 4, the wall mounts of the DSLs (FIG. 10) will be activated to flash (FIG. 11) to warn personnel in the corridor layer 5 (FIGS. 12C-12D) and in the suite of individual offices (layer 6) to remove the lid and install the DSL at their respective doors. In addition, the entrance portal doors 50 to the corridor will be maintained closed and a DSL installed at the corridor side of those doors 50. Thus, personnel in the corridor layer 5 will shelter-in place in their respective rooms by installing their DSLs and at the entrance portal doors 50.

As described above, the DSL is actually part of a "shelter-in-place (SIP) system that is sold under the tradename OCCUPANT PRESERVER™. The system, as shown most clearly in FIG. 10, comprises a portable door shelter lock (DSL) that is initially stowed within a wall-mounted storage unit and covered by a lid. Should a perpetrator penetrate to layer 5, the RPCMS 54 will activate a visual indicator (see FIG. 11A) on the wall-mount, thus acting as a "silent alarm" to personnel in the corridor 5 layer and the individual rooms of layer 6. Upon seeing the visual indicator, the occupant(s) in that room will close the door, slide the lid off (as shown in FIG. 10) of the wall-mounted storage unit, remove the DSL off of the wall mount and install the portable DSL into a mounting bracket on the bottom edge of the door and then step downward on the DSL, thereby positioning a plurality of locating pins down within a floor strike. That action locks the door shut and should the perpetrator try to open the door using the door knob or even try to shoot the door knob, that will have no effect on the DSL which will keep the door closed. Moreover, the act of lifting the lid off of the wall-mounted storage unit by the occupants immediately sends first responders the exact location of that DSL. The visual indicator on the lid acts as a "silent alarm" to the occupants who have been previously trained in using the DSL and system. As such, within a few minutes, first responders will be present and the police will be on full notice of just where people have sheltered-in-place.

Staff will need to be trained as well as policies developed for the remote door locking procedure as well as fire alarm override. "Piggy-backing" prevention devices will be incorporated and fine-tuned to meet traffic flow requirements.

The present invention 20 is the only system/approach of its kind that will accommodate maximum daily weapons screening without tradeoff to event-based evacuation or Responder "Ready Access".

It should be noted that the system and method of the present invention 20 is applicable to non-fire doors only. In the event of required weapons detection adjacent to a fire wall/barrier, a new/secondary opening must be created without adverse impact to the current fire doors and not inhibit the first set of doors from closing. The weapons detection would then be installed in a new doorway where one "door leaf" was "occupied by the detection area" and the second door leaf would provide for full swing access, thereby preserving the original design intent of required egress capacity based on occupancy load and travel distances within the building.

Although not shown, real-time signage can also be implemented in corridors to instruct occupants where to go during emergency situations.

It should also be understood that there may be layers of protection that will be "manned" meaning that there will be an actual security officer that can confront, apprehend, divert and otherwise take immediate action rather than relying on the remote portal controlling and monitoring system to responds.

Like the invention 20, the portals throughout the MLPS 100 must be able to swing open to establish the "clear opening width" in the event of emergencies such as (1) immediate egress; (2) a fire alarm; or (3) a power failure.

In view of the foregoing, the MLPS 100 will ensure a unified response through unified pre-entered information.

As a reiteration of all of the foregoing, should a fire alarm be activated, where the need to provide maximum egress through all portals is required, FACILITYSOFT® software 56 via the PORTAL LOGICS™ system 54 will override the maglocks on the doors to restore full egress to the portals. Furthermore, individuals at the EGRESS PRESERVER™ weapons detection system 20 have the added and direct ability to activate the panic hardware 26 to open the door D to restore full egress PW2 thereat.

REFERENCE CHARACTERS

FAP fire alarm panel
OMS other monitoring systems
P1 smaller restricted pathway;
PD1 first weapons detector pedestal;
PD2 second weapons detector pedestal;
PW1 normal pathway (or "lane") width with invention installed
PW2 maximum doorway width with invention installed
MLPS multi-layer protection system
RPCMS remote portal controlling and monitoring system: PORTAL LOGICS™
1 first layer (entire building perimeter) of MLPS
2 second layer (scan location of invention 20, also referred to as "virtual ring" up to the invention 20, EGRESS PRESERVER™) of MLPS
3 third layer (vestibule, physical entry vestibule) of MLPS
4 fourth layer (lobby or other area adjoining the vestibule) of MLPS
5 fifth layer (corridor, or other "contained perimeter" with one or more rooms) of MLPS
6 sixth layer (individual rooms/areas that can be sheltered within) of MLPS
10 building structure supporting doorway
12 floor at doorway
20 weapons detection system at a portal (aka "logical barrier" or "demising point"): EGRESS PRESERVER™
22 portal frame
22A first post
22B second post
22C lintel
23 electrified hinges
24A first pedestal of weapons detector
24B second pedestal of weapons detector
25 laser scanner
26 panic or release bar on inside of door
27 vision panel (e.g., window)
28 maglock
30A-30F protection/alignment rings
32 bottom protection ring
32A U-shaped channel
33 access panel/opening on door
34 metal support plate

36 backplate
38 tongue
40 groove
42 apertures in backplate
44 apertures in metal support plate
44A apertures in bottom edge of backplate
46 vestibule doors
48 visual indicator on DSL wall-mounted storage unit
50 corridor portal doors
52 shelter-in-place (SIP) system having the door shelter lock (DSL) and wall-mount with alert location signal: OCCUPANT PRESERVER™
54 RPCMS remote portal controlling and monitoring system: PORTAL LOGICS™
56 facility governance and integration software: FACILITYSOFT®
100 MLPS
102 annunciator panel While the invention has been described in detail and with reference to specific examples thereof, it will be apparent to one skilled in the art that various changes and modifications can be made therein without departing from the spirit and scope thereof.

What is claimed is:

1. A system for providing weapons detection at a portal of an enclosure while simultaneously permitting a clear opening width of the portal at any time without the need for third party action or special knowledge, the portal having an open pathway and an adjacent door leaf that is normally locked closed, said system comprising:

a pair of metal detector pedestals, a first one of which is secured to a door frame on a first side of said open pathway and a second metal detector pedestal secured to a free side of the door leaf, said free side of the door leaf forming a second side of said open pathway, each of said pedestals being coupled to a power source for establishing an electromagnetic (EM) metal detection field therebetween across said open pathway; and a panic bar located on the inside side of the door leaf, said panic bar configured to override a lock on the door leaf to permit the door to be immediately unlocked and swung open in the event that the clear opening width be established in an emergency.

2. The system of claim 1 wherein said pair of metal detector pedestals are coupled to a monitoring system such that if said pair of metal detector pedestals detects a metal object therein, an alert will be generated.

3. The system of claim 2 further comprising a laser scanner located above said pair of metal detector pedestals, said laser detector coupled to a power source for establishing another detection field above said pair of metal detector pedestals to prevent a perpetrator from circumventing said EM metal detection field by passing an item above said pair of pedestals.

4. The system of claim 1 wherein said laser scanner is also coupled to said monitoring system such that if said laser scanner detects an object in said another detection field, an alert will be generated.

5. The system of claim 1 wherein said first and second metal detector pedestals are coupled to said door frame and said free end of the door leaf, respectively, using a plurality of non-metal rings that are releasably secured to a respective backplate which is fastened to the door frame and to the free side of the door leaf.

6. The system of claim 1 wherein said normally locked door leaf is locked using an electromagnetic lock and wherein said panic bar overrides said electromagnetic lock when activated to immediately permit the door leaf to be opened.

7. The system of claim 6 wherein the door leaf comprises a window therein to allow a person activating said panic bar to determine if someone is on an opposite side of the door leaf before opening.

8. The system of claim 2 wherein the door leaf is mounted to the door frame using electrified hinges to permit power and data signals to be conveyed between said second metal detector pedestal and said power source and said monitoring system.

9. The system of claim 1 wherein a distance between the first and second metal detecting pedestals in the range of 32-36 inches across the open pathway.

10. A method for providing weapons detection at a portal of an enclosure while simultaneously permitting a clear opening width of the portal at any time without the need for third party action or special knowledge, the portal having an open pathway and an adjacent door leaf, said method comprising:

mounting a first metal detector pedestal on a door frame on a first side of the open pathway;

mounting a second metal detector pedestal on a free side of the door leaf, said free side of the door leaf forming a second side of said open pathway;

providing electrical power to said first and second metal detectors to establish an electromagnetic (EM) metal detection field therebetween across said open pathway, and wherein power to said second metal detector is conveyed through electrified hinges;

locking the door leaf using an electromagnetic lock;

installing a panic bar on an inside side of the door leaf, said panic bar overriding said electromagnetic lock when said panic bar is activated during an emergency; and opening the door leaf in an emergency by activating said panic bar to establish the clear opening width of the portal.

11. The method of claim 10 further comprising the step of terminating the EM metal detection field as soon as the door leaf is opened and immediately re-establishing the EM metal detection field when the door leaf is locked closed again.

12. The method of claim 11 further comprising the step of mounting a laser scanner above said first and second metal detector pedestals, said laser scanner being activated to establish another detection field above said first and second metal detector pedestals to prevent a perpetrator from circumventing said EM metal detection field by passing an item above said pair of pedestals.

13. The method of claim 12 further comprising the step of coupling said first and second metal detecting pedestals and said laser scanner to a monitoring system such that if said first and second metal detecting pedestals detect a metal object within said EM metal detection field, or said laser scanner detects an object in said another detection field, an alert will be generated.

14. The method of claim 10 wherein further comprising the step of reinforcing the door frame, prior to mounting said first and second metal detector pedestals, to accommodate an added weight of said first and second metal detector pedestals on said door frame and the door leaf.

15. The method of claim 10 wherein said steps of mounting said first metal detector pedestal to the door frame and mounting said second metal detector pedestal to the free side of the door leaf comprises:

releasably securing a plurality of non-metal rings to a respective backplate and then securing said backplates to the door frame and to the free side of the door leaf; and sliding a respective pedestal through said respective plurality of non-metal rings.

16. The method of claim 10 further comprising the step of forming a window within the door leaf to allow a person activating said panic bar to determine if someone is on an opposite side of the door leaf before opening.

17. The method of claim 10 wherein said steps of mounting said first metal detecting pedestal to the door frame and mounting said second metal detecting pedestal on said free side of the door leaf establishes a distance between said pedestals in the range of 32-36 inches across the open pathway.

18. The method of claim 11 further comprising the step of setting off an alarm whenever the door leaf is opened and maintaining that alarm until the door leaf is locked closed again.

19. A building defense system for protecting occupants in a building and formed of a plurality of layers of protection, said system comprising:

a first layer of protection formed at a building perimeter portal, said first layer of protection comprising a security card reader or keypad for gaining access to the building, said security card reader and said keypad being coupled to a remote portal controlling and monitoring system;

a second layer of protection, forming a demising point, comprising a weapons detection system at a portal inside said building after said building perimeter portal and having an open pathway and a normally locked closed door leaf, said weapons detection system comprising a first metal detector pedestal attached to a first side of the open pathway on a portal door frame and a second metal detector pedestal attached to a free side of the door leaf that forms a second side of the open pathway, each of said pedestals coupled to a power source for establishing an electromagnetic (EM) metal detection field therebetween across said open pathway; said pedestals coupled to said monitoring system such that if said pair of metal detector pedestals detects a metal object therein on a person requesting entry (PRE), an alert is generated; and a third layer of protection at a vestibule portal, following said demising point, said vestibule having a portal that is maintained in a locked condition by said monitoring system in the event that said weapons detection system detected a metal object on the PRE at said demising point or said PRE refuses to follow instructions, and either one now designated a person denied entry (PDE) while simultaneously instructing personnel on an opposite of said portal to avoid trying to pass through said portal and to divert the personnel to an alternate path away from said PDE.

20. The system of claim 19 further comprising:

a fourth layer of protection at a lobby location, said lobby location have a lobby portal whose doors are also electronically controlled by said monitoring system and maintained in a locked condition to prevent the passage of the PDE therethrough while simultaneously preventing personnel on an other side of said portal doors from attempting to pass through said portal doors.

21. The system of claim 20 further comprising real-time signage for instructing the personnel on said other side of said portal doors to an alternate path away from the PDE.

22. The system of claim 20 further comprising:

a fifth layer of protection at a corridor off of said lobby location, said fifth layer of protection having a set of doors that are also always locked to prevent passage through a portal between said lobby location and said corridor.

23. The system of claim 22 further comprising:

a sixth layer of protection at individual rooms off of the corridor and each individual room having a room door, each of said individual rooms having a door shelter lock (DSL) stowed in a wall-mounted storage unit having a visual indicator; and wherein activation of said visual indicator provides a silent alarm to personnel in the rooms to shelter-in-place by removing a lid off of said wall-mounted storage unit, removing said DSL therein and installing in a mounting bracket on a bottom portion of the room door and activating said DSL.

24. The system of claim 19 wherein said weapons detection system further comprises a laser scanner mounted above said first and second metal detector pedestals to generate another detection field above said EM metal detection field.

25. A method of protecting occupants in a building using a plurality of layers of protection, said method comprising:

establishing a first layer of protection at a building perimeter portal by providing a security card reader or keypad for gaining access to the building and coupling said security card reader and said keypad to a remote portal controlling and monitoring system;

establishing a second layer of protection by providing a weapons detection system at a portal inside said building after said building perimeter portal and wherein said portal of said second layer of protection comprises an open pathway and a normally locked closed door leaf, said weapons detection system comprising a first metal detector pedestal attached to a first side of the open pathway on a portal door frame and a second metal detector pedestal attached to a free side of the door leaf that forms a second side of the open pathway, each of said pedestals coupled to a power source for establishing an electromagnetic (EM) metal detection field therebetween across said open pathway; said pedestals coupled to said monitoring system such that if said pair of metal detector pedestals detects a metal object therein on a person requesting entry (PRE), an alert is generated, said portal with said weapons detection system forming a demising point; and establishing a third layer of protection by providing a vestibule portal, following said demising point, said vestibule portal being maintained in a locked condition by said monitoring system in the event that said weapons detection system detected a metal object on the PRE at said demising point or said PRE refuses to follow instructions, and either one now designated a person denied entry (PDE) while simultaneously instructing personnel on an opposite of said portal to avoid trying to pass through said portal and to divert the personnel to an alternate path away from said PDE.

26. The method of claim 25 further comprising the step of establishing a fourth layer of protection at a lobby location, said lobby location have a lobby portal whose doors are also electronically controlled by said monitoring system and maintained in a locked condition to prevent the passage of the PDE therethrough while simultaneously preventing personnel on an other side of said portal doors from attempting to pass through said portal doors.

27. The method of claim 26 further comprising the step of providing real-time signage for instructing the personnel on said other side of said portal doors to an alternate path away from the PDE.

28. The method of claim 26 further comprising the step of establishing a fifth layer of protection at a corridor off of said lobby location, said fifth layer of protection having a set of doors that are also always locked to prevent passage through a portal between said lobby location and said corridor.

29. The method of claim 28 further comprising the step of establishing a sixth layer of protection at individual rooms off of the corridor and each individual room having a room door, each of said individual rooms having a door shelter lock (DSL) stowed in a wall-mounted storage unit having a visual indicator, wherein activation of said visual indicator provides a silent alarm to personnel in the rooms to shelter-in-place by removing a lid off of said wall-mounted storage unit, removing said DSL therein and installing in a mounting bracket on a bottom portion of the room door and activating said DSL.

30. The method of claim 25 wherein said step of establishing said second layer comprises weapons comprises securing a laser scanner mounted above said first and second metal detector pedestals to generate another detection field above said EM metal detection field.

* * * * *